(12) United States Patent
Erk

(10) Patent No.: US 8,828,324 B2
(45) Date of Patent: Sep. 9, 2014

(54) FLUIDIZED BED REACTOR SYSTEMS AND DISTRIBUTORS FOR USE IN SAME

(75) Inventor: Henry F. Erk, St. Louis, MO (US)

(73) Assignee: SunEdison, Inc., St. Peters, MO (US)

(*) Notice: Subject to any disclaimer, the term of this patent is extended or adjusted under 35 U.S.C. 154(b) by 0 days.

(21) Appl. No.: 12/977,849

(22) Filed: Dec. 23, 2010

(65) Prior Publication Data

US 2011/0158857 A1 Jun. 30, 2011

Related U.S. Application Data

(60) Provisional application No. 61/290,692, filed on Dec. 29, 2009.

(51) Int. Cl.
*B01J 8/24* (2006.01)
*B01J 8/44* (2006.01)
*F23C 10/20* (2006.01)
*F27B 15/10* (2006.01)
*B01J 8/18* (2006.01)
*C01B 33/107* (2006.01)
*C01B 33/03* (2006.01)
*C01B 33/031* (2006.01)

(52) U.S. Cl.
CPC ............ *C01B 33/10773* (2013.01); *B01J 8/44* (2013.01); *F23C 10/20* (2013.01); *F27B 15/10* (2013.01); *B01J 8/1827* (2013.01); *C01B 33/1071* (2013.01); *C01B 33/03* (2013.01); *C01B 33/031* (2013.01)
USPC .............. 422/139; 422/143; 422/311; 34/582

(58) Field of Classification Search
CPC ............... B01J 8/44; B01J 2208/00938; B01J 2208/0092; F26B 3/082
USPC ............................. 422/143, 311; 34/582, 585
See application file for complete search history.

(56) References Cited

U.S. PATENT DOCUMENTS

| | | | |
|---|---|---|---|
| 2,487,984 A | | 10/1945 | Rodman |
| 2,468,508 A | | 4/1949 | Munday |
| 2,740,752 A | * | 4/1956 | Anhorn ........................ 208/157 |
| 3,016,624 A | | 1/1962 | Bliss |
| 3,636,923 A | * | 1/1972 | McCreary et al. ............ 118/400 |
| 3,933,985 A | | 1/1976 | Rodgers |
| 4,092,446 A | | 5/1978 | Padovani et al. |
| 4,170,667 A | | 10/1979 | Rodgers |
| 4,213,937 A | | 7/1980 | Padovani et al. |

(Continued)

FOREIGN PATENT DOCUMENTS

| | | |
|---|---|---|
| CA | 1332782 | 11/1994 |
| CN | 101346178 A | 1/2009 |

(Continued)

OTHER PUBLICATIONS

English Abstract fo JP 04-297515 A (Oct. 1992).*

(Continued)

*Primary Examiner* — Jennifer A Leung
(74) *Attorney, Agent, or Firm* — Armstrong Teasdale LLP

(57) ABSTRACT

Fluidized bed reactor systems and distributors are disclosed as well as processes for producing polycrystalline silicon from a thermally decomposable silicon compound such as trichlorosilane. The processes generally involve reduction of silicon deposits on reactor walls during polycrystalline silicon production by use of a silicon tetrahalide.

17 Claims, 15 Drawing Sheets

(56) References Cited

U.S. PATENT DOCUMENTS

| | | | |
|---|---|---|---|
| 4,318,942 A | 3/1982 | Woerner et al. | |
| 4,464,222 A | 8/1984 | Gutsche | |
| 4,491,604 A | 1/1985 | Lesk et al. | |
| 4,529,576 A | 7/1985 | Sancier | |
| 4,818,495 A | 4/1989 | Iya | |
| 4,868,013 A | 9/1989 | Allen | |
| 5,374,413 A | 12/1994 | Kim et al. | |
| 5,798,137 A | 8/1998 | Lord et al. | |
| 6,007,869 A | 12/1999 | Schreieder et al. | |
| 6,352,680 B1 | 3/2002 | Watson et al. | |
| 6,368,568 B1 | 4/2002 | Lord | |
| 6,451,277 B1 | 9/2002 | Lord | |
| 6,541,377 B2 | 4/2003 | Kim et al. | |
| 6,709,636 B1 * | 3/2004 | Oshita et al. | 422/146 |
| 6,719,952 B1 | 4/2004 | Yang et al. | |
| 6,827,786 B2 | 12/2004 | Lord | |
| 6,932,954 B2 | 8/2005 | Wakamatsu et al. | |
| 7,029,632 B1 | 4/2006 | Weidhaus et al. | |
| 7,922,990 B2 | 4/2011 | Hertlein et al. | |
| 7,927,984 B2 | 4/2011 | Molnar | |
| 2002/0081250 A1 | 6/2002 | Lord | |
| 2003/0147798 A1 | 8/2003 | Kirii et al. | |
| 2004/0052692 A1 * | 3/2004 | Hottovy et al. | 422/143 |
| 2004/0052716 A1 | 3/2004 | Wakamatsu et al. | |
| 2004/0241867 A1 | 12/2004 | Jones et al. | |
| 2008/0056979 A1 | 3/2008 | Arvidson et al. | |
| 2008/0241046 A1 | 10/2008 | Hertlein et al. | |
| 2009/0004090 A1 | 1/2009 | Kim et al. | |
| 2009/0039573 A1 * | 2/2009 | Hauzenberger et al. | 266/251 |
| 2009/0095710 A1 | 4/2009 | Kim et al. | |
| 2009/0324479 A1 | 12/2009 | Kulkarni et al. | |

FOREIGN PATENT DOCUMENTS

| | | | |
|---|---|---|---|
| JP | 59045917 A | | 3/1984 |
| JP | 59107917 A | | 6/1984 |
| JP | 62079843 A | * | 4/1987 |
| JP | 2279512 A | | 11/1990 |
| JP | 04297515 A | * | 10/1992 |
| JP | 06127924 A | | 5/1994 |
| WO | 2004013044 A1 | | 2/2004 |
| WO | 2007012027 A2 | | 1/2007 |
| WO | 2007028776 A2 | | 3/2007 |
| WO | WO 2007079939 A1 | * | 7/2007 |
| WO | 2007094607 A1 | | 8/2007 |
| WO | 2007145474 A1 | | 12/2007 |
| WO | 2008027101 A1 | | 3/2008 |

OTHER PUBLICATIONS

English Abstract for JP 62-079843 A (Apr. 1987).*
International Search Report and Written Opinion mailed on May 17, 2011 in International Application No. PCT/US2010/062088 filed Dec. 23, 2010.
Co-Owned U.S. Appl. No. 12/977,739, filed Dec. 23, 2010.
Perry's Chemical Engineers' Handbook, 7th Ed., 17-4, Gas-Solid Operations and Equipment, 1 page.
Nicola Goldberg, et al., Reactions of SiCl2 with N2O, NO and O2, PCCP, Phys. Chem. Chem. Phys., 2003, 5, pp. 5371-5377.
Uda Hashim, et al., High Purity Polycrystalline Silicon Growth and Characterization, Chiang Mai J. Sci, 2007, 34(1), pp. 47-53.
International Search Report and Written Opinion for International Application No. PCT/US2009/049113 mailed Dec. 30, 2009.
Office Action dated Mar. 3, 2011 for Co-Owned U.S. Appl. No. 12/494,006, filed Jun. 29, 2009.
Office Action dated Aug. 10, 2011 in Co-Owned U.S. Appl. No. 12/494,006.
Co-Owned U.S. Appl. No. 13/163,027, filed Jun. 17, 2011.
Co-Owned U.S. Appl. No. 12/494,006, filed Jun. 29, 2009.
Perry et al., "Design of Fluidized-Bed Systems" Perry's Chemical Engineers' Handbook, 7th Ed., pp. 17-4 to 17-19 (1997).
International Search Report issued for Co-owned application Serial No. PCT/US2009/049113, dated Dec. 30, 2009 (4 pages).
Non-Final Office action issued Sep. 17, 2012 for co-owned U.S. Appl. No. 13/455,483 (10 pages).
Office Action issued in European Patent Application No. 10 805 357.0 on May 7, 2013, 4 pages.
Search Report, Taiwan Patent Application No. 099146697, dated Apr. 23, 2014, pp. 1.

* cited by examiner

FLUIDIZED BED REACTOR SYSTEMS AND DISTRIBUTORS FOR USE IN SAME

CROSS-REFERENCE TO RELATED APPLICATION

This application claims the benefit of U.S. Provisional Patent Application No. 61/290,692, filed Dec. 29, 2009, which is incorporated herein by reference it its entirety.

BACKGROUND

This disclosure relates to fluidized bed reactor systems and to the production of polycrystalline silicon from a thermally decomposable silicon compound such as, for example, trichlorosilane and, particularly, to methods that involve reduction of silicon deposits on reactor walls during polycrystalline silicon production.

Fluidized bed reactors are used to carry out multiphase reactions. In typical fluidized bed reactor systems a fluid is passed through a bed of granular material such as a catalyst or growing product particles. The flow of fluid causes the bed of granular material to become fluidized in the reactor.

Polycrystalline silicon is a vital raw material used to produce many commercial products including, for example, integrated circuits and photovoltaic (i.e., solar) cells. Polycrystalline silicon is often produced by a chemical vapor deposition mechanism in which silicon is deposited from a thermally decomposable silicon compound onto silicon particles in a fluidized bed reactor. The seed particles continuously grow in size until they exit the reactor as polycrystalline silicon product (i.e., "granular" polycrystalline silicon). Suitable decomposable silicon compounds include, for example, silane and halosilanes such as trichlorosilane.

In many fluidized bed reactor systems and especially in systems where material from the fluid phase chemically decomposes to form solid material such as in polycrystalline silicon production systems, solids may deposit onto the walls of the reactor. The wall deposits often alter the reactor geometry which can decrease reactor performance. Further, portions of the wall deposits can dislodge from the reactor wall and fall to the reactor bottom. Often the reactor system must be shut down to remove the dislodged deposits. To prevent an untimely reactor shut down, the deposits must be periodically etched from the reactor wall and the reactor must be cleaned thereby reducing the productivity of the reactor. The etching operations may cause stress to the reactor system due to thermal shock or differences in thermal expansion or contraction which may result in cracking of the reactor walls which requires the unit to be rebuilt. These problems are particularly acute in fluidized bed reactor systems used in the production of polycrystalline silicon.

Thus a continuing need exists for reactor systems and methods for producing polycrystalline silicon which limit or reduce the amount of deposits on the reactor walls.

SUMMARY

One aspect of the present disclosure is directed to a distributor for distributing a first gas, a second gas and a third gas into a reaction chamber having at least one reaction chamber wall. The distributor includes a plurality of distribution openings including at least one peripheral opening, at least one interior opening and at least one central opening. The peripheral openings are configured to provide fluid communication with the source of first gas and not the source of second gas or the source of third gas.

Another aspect of the present disclosure is directed to a fluidized bed reactor system including a reaction chamber and a distributor for distributing gas into the reaction chamber. The reaction chamber has at least one reaction chamber wall. The distributor has a plurality of distribution openings which provide fluid communication between the reaction chamber and a source of a first gas, a source of a second gas and a source of third gas. The plurality of distribution openings include at least one peripheral opening, at least one interior opening and at least one central opening. The peripheral openings are configured to provide fluid communication with the source of first gas and not the source of second gas or the source of third gas.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

The fluidized bed reactor systems and gas distribution units described herein are suitable for distributing a first gas, a second gas and, in some embodiments, a third gas to a fluidized bed reactor and for depositing a compound from one of the gases on the surface of fluidized particles. The reactor systems and distribution units are especially well suited for reducing the rate of deposition of thermally decomposable compounds (e.g., deposition of silicon from trichlorosilane) on the walls of the reactor. The distributors of the reactor systems are configured to direct the thermally decomposable compounds to the interior portion of the reactor and away from the reactor wall to prevent deposition of material (e.g., such as silicon) on the reactor wall. In some embodiments, the distributors are configured to direct a third gas (e.g., hydrogen) that may be at an elevated temperature relative to the thermally decomposable compound into the reactor at a point different than the thermally decomposable compounds to allow the third gas to transfer heat to the thermally decomposable compounds away from the distributor and lower portions of the reactor. The systems may be used to produce polycrystalline silicon from a thermally decomposable silicon compound as described below under the heading "Process for Producing Polycrystalline Silicon."

I. Fluidized Bed Reactor System

Figure 1:
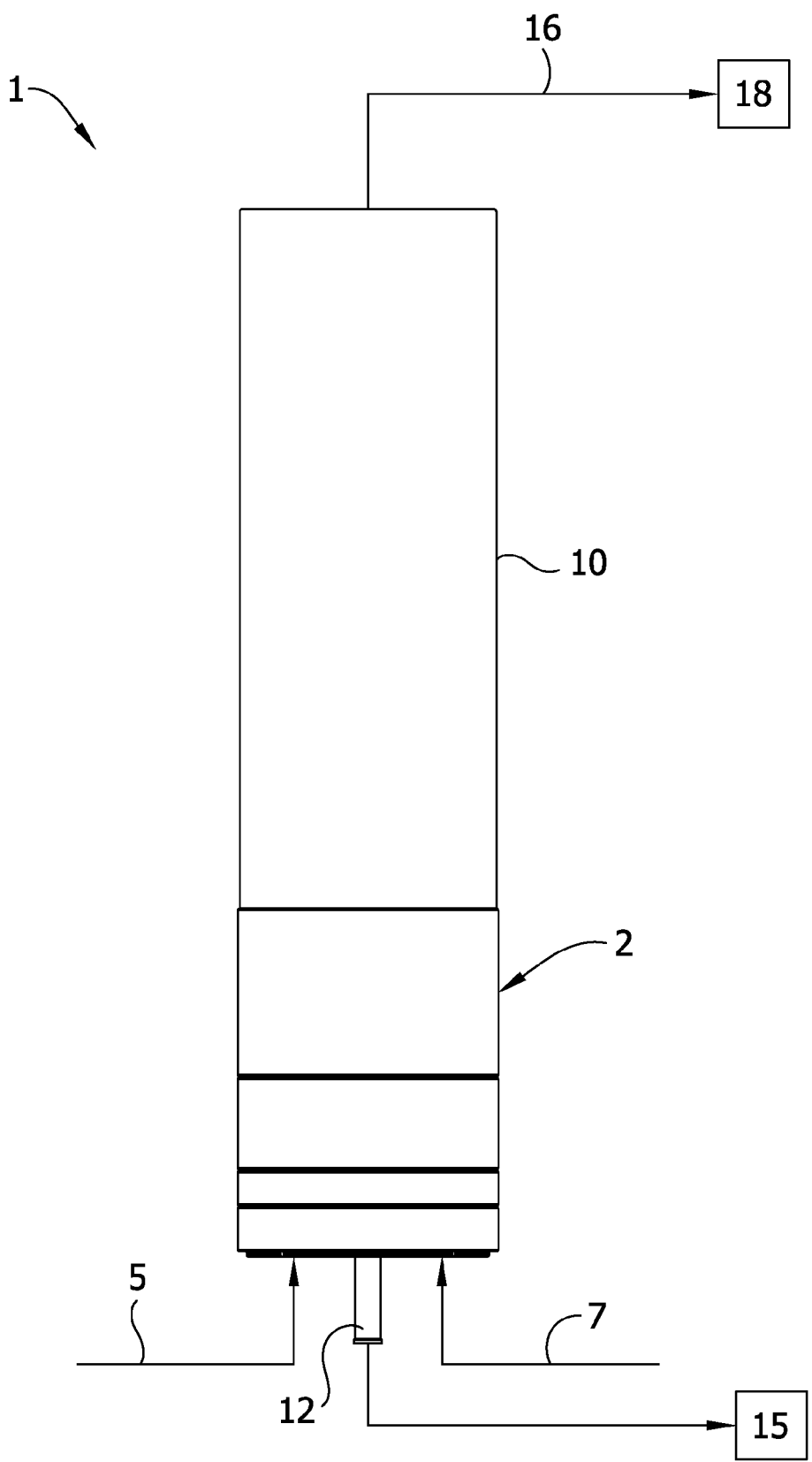
FIG. 1 is a schematic of the flows entering and exiting a first embodiment of a fluidized bed reactor system.

Referring now to FIG. 1, a fluidized bed reactor constructed in accordance with embodiments of the present disclosure is generally designated as 1. The reactor system 1 includes a reaction chamber 10 and a gas distribution unit 2. A source of a first gas 5 and a source of second gas 7 are introduced into the distribution unit 2 to evenly distribute the respective gases into the inlet of the reaction chamber 10. The distribution unit 2 helps evenly distribute reactive gases throughout the reaction chamber 10 to maximize contact between the fluid and the fluidized particles in the chamber.

As used herein, "first gas" is a gas with a different composition than the "second gas" and vice versa. The first gas and second gas can compose a plurality of gaseous compounds as long as the mass composition or molar composition of at least one of the compounds in the first gas is different than the composition of that compound in the second gas.

A product withdrawal tube 12 extends through the gas distribution unit 2. Product particles can be withdrawn from the tube 12 and transported to product storage 15. Spent gas 16 exits the reactor chamber 10 and can be introduced into further processing units 18.

Figure 2:
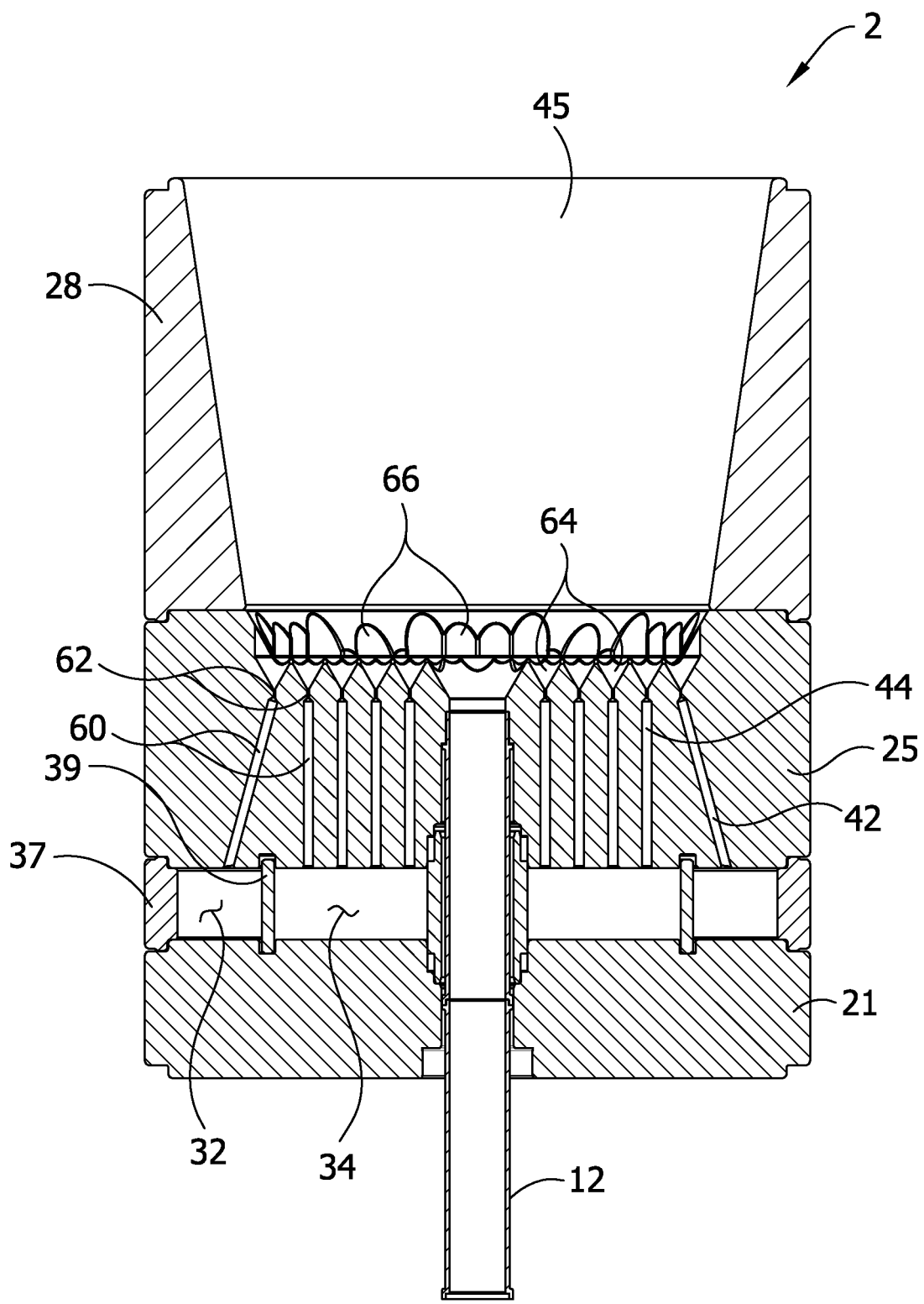
FIG. 2 is a longitudinal section of one embodiment of a gas distribution unit.

The gas distribution unit 2 is shown in greater detail in FIG. 2. The gas distribution unit 2 is suitable for distributing a first gas and a second gas to a fluidized bed reactor and is especially well suited for distributing a carrier gas and a thermally decomposable gas to a fluidized bed reactor.

The gas distribution unit 2 includes an inlet block 21, distributor 25 and taper liner 28. An outer ring 37 and a concentric interior ring 39 are located between the inlet block 21 and distributor 25. A first gas plenum 32 is defined between the outer ring 37 and the interior ring 39. The product recovery tube 12 is concentric to the outer ring 37 and interior ring 39. The tube 12 extends below the inlet block 21. A second gas plenum 34 is defined between the interior ring 39 and the tube 12.

The taper liner 28 defines a liner chamber 45. The liner chamber 45 opens into the cylindrical section of the reaction chamber (not shown) and tapers outward in diameter from the distributor 25 to the cylindrical section of reaction chamber. Because particles and incoming gases come into contact in the liner chamber 45 and because a majority of the system reactions may take place in the liner chamber, the liner chamber is considered part of the reaction chamber. For purposes of the application, "reaction chamber" as used herein includes the liner chamber 45.

A series of peripheral distribution openings 42 and interior distribution openings 44 are located within the distributor 25. As used herein, "peripheral distribution openings" or "peripheral openings" refer to distributor openings that are generally near the outer wall(s) of the reaction chamber in relation to the interior openings and "interior distribution openings" or "interior openings" refer to distributor openings that are generally interior to the peripheral openings. The peripheral openings 42 are in fluid communication with the first gas plenum 32 and the reaction chamber 10. The interior openings 44 are in fluid communication with the second gas plenum 34 and the reaction chamber 10. Generally, the peripheral openings are not in fluid communication with the second gas and the interior openings are not in fluid communication with the first gas.

When the first gas does not contribute (or contributes to a lesser extent than the second gas) to deposition of material on the particles (e.g., when the first gas is hydrogen or an inert gas such as a noble gas), configuring the peripheral openings to be in fluid communication with the first gas causes a larger concentration of the first gas to be present at the walls of the reaction chamber as compared to the interior space. This causes less material to deposit from the second gas onto the reactor walls as compared to a configuration where the first and second gases are evenly distributed through the distributor 25. In some embodiments, the first gas may include materials that etch deposits on the walls of the reactor (e.g., as in polycrystalline silicon production when silicon tetrahalide is used as an etching gas as described below).

In some embodiments, a portion of the peripheral openings are in fluid communication with the second gas and a portion of the interior openings are in fluid communication with the first gas. In these embodiments, generally the percentage of the peripheral openings in fluid communication with the first gas is greater than the percentage of interior openings in fluid communication with the first gas. This configuration also causes a larger concentration of first gas (e.g., a carrier gas such as hydrogen, an inert or an etching gas such as silicon tetrachloride) to be present at the walls of the reaction chamber as compared to the interior space of the reaction chamber.

The interior openings 44 and peripheral openings 42 include a channel portion 60, a throttle portion 62 and flare out portion 64. The flare out portion 64 opens into a cone 66. The throttle portion 62 helps to provide resistance to flow and allows the gas to be evenly distributed through each opening 42, 44 and into the inlet of the reaction chamber 10. The cones 66 help distribute the gas from the openings 42, 44 into the reaction chamber 10. The cones 66 are generally hexagonal in shape (FIG. 5).

Figure 3:
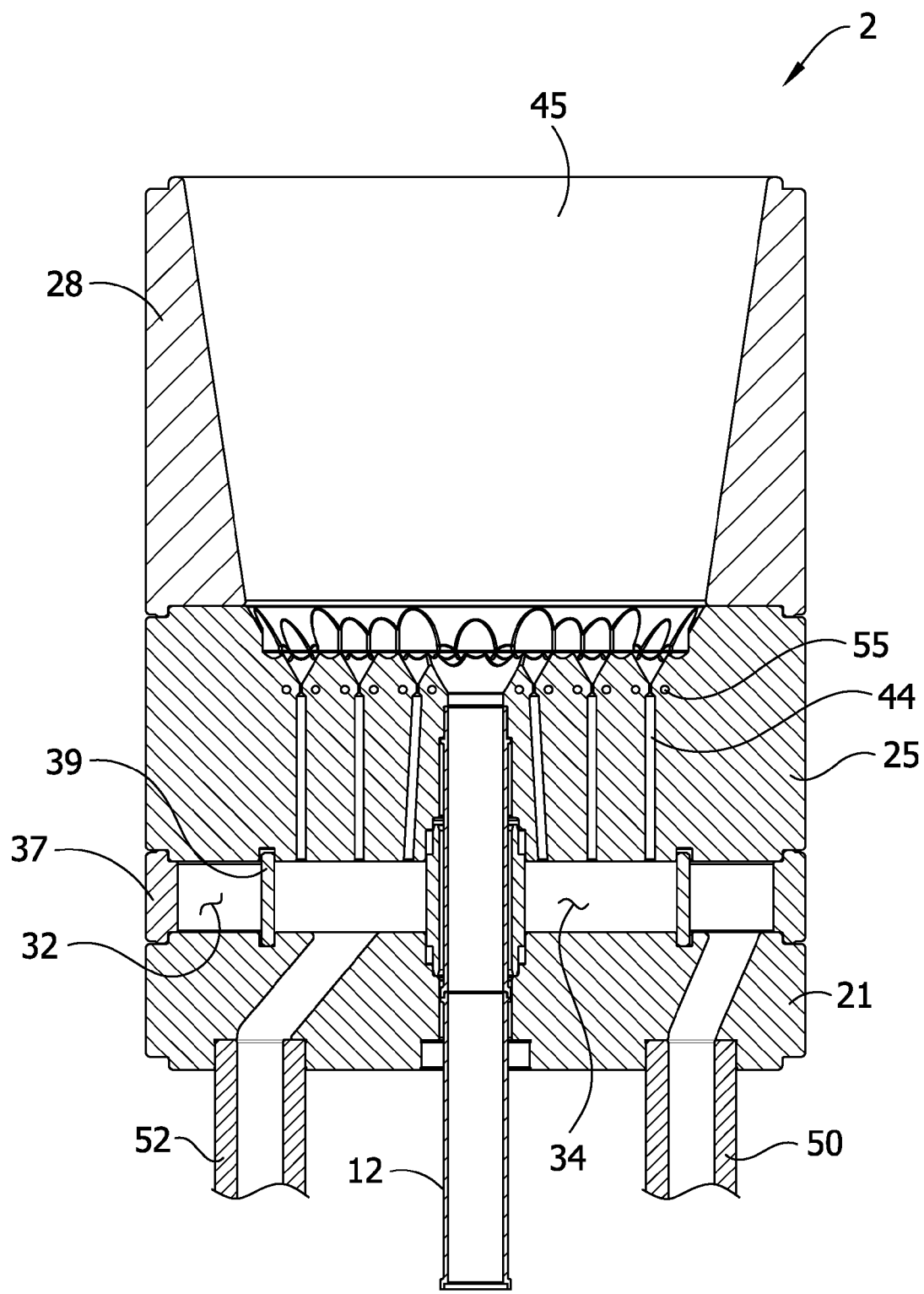
FIG. 3 is a second longitudinal section the gas distribution unit.

Another longitudinal section of the gas distribution unit 2 is illustrated in FIG. 3 with several other features of the unit shown. A first gas inlet tube 50 extends through the inlet block 21 and is in fluid communication with the first gas plenum 32 and a source of first gas (not shown). A second gas inlet tube 52 extends through the inlet block 21 and is in fluid communication with the second gas plenum 34 and a source of second gas (not shown).

Cooling channels 55 are located in the distributor 25. Fluid (e.g., air or cooling liquid) is circulated through the cooling channels 55 to cool the distributor below the temperature at which material thermally decomposes from the first or second gases. The cooling channels 55 prevent material from depositing on the interior distributor openings 44. The distributor 25 may optionally include cooling channels (not shown) near the peripheral distributor openings 42 (FIG. 2). In this regard, it should be understood that arrangements of cooling channels other than as shown and described may be used without limitation and, in some embodiments, cooling channels are not formed in the distributor 25.

Figure 4:
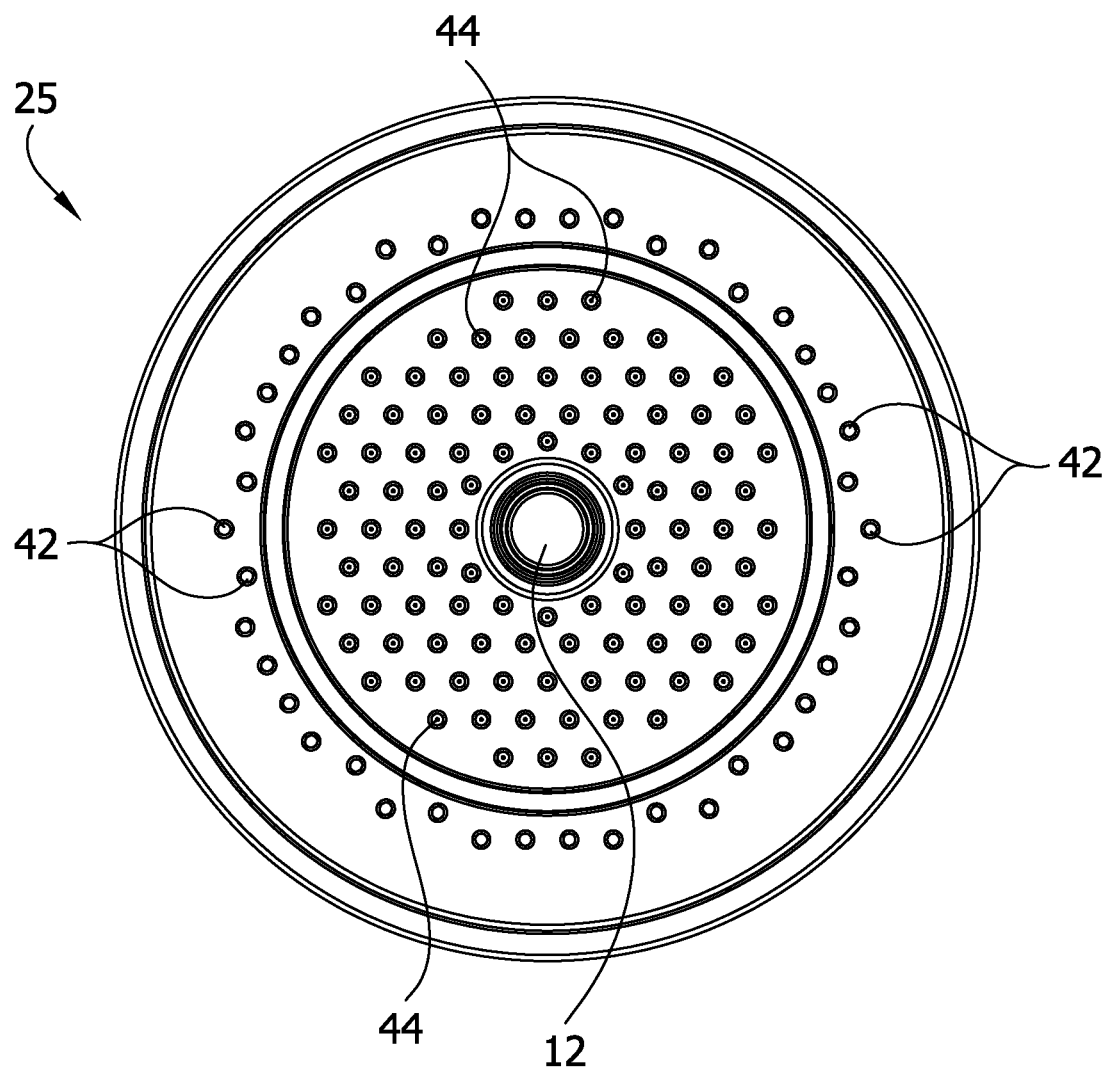
FIG. 4 is a bottom view of the distributor of the gas distribution unit.
Figure 5:
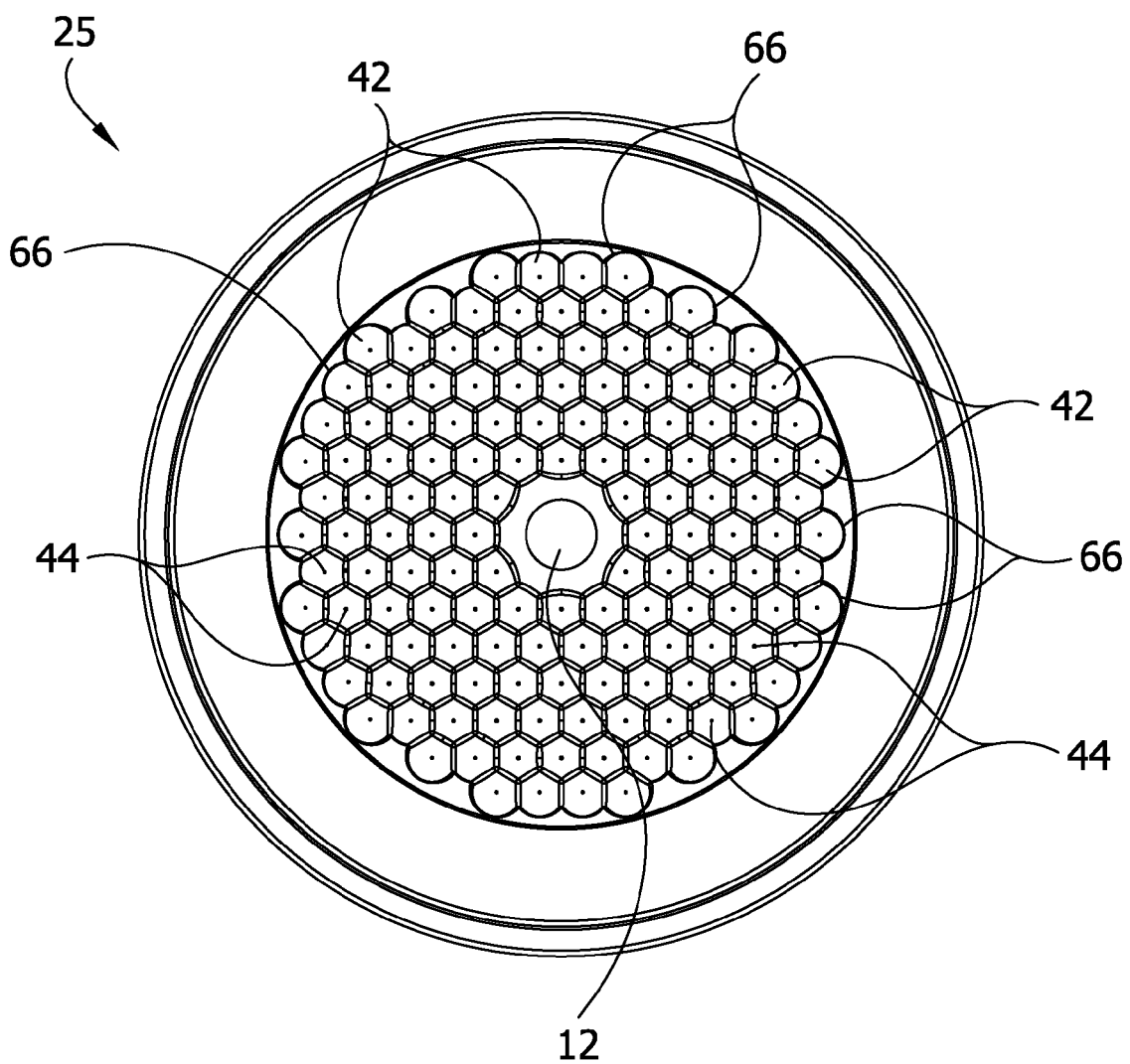
FIG. 5 is a top view of the distributor of the gas distribution unit.
Figure 6:
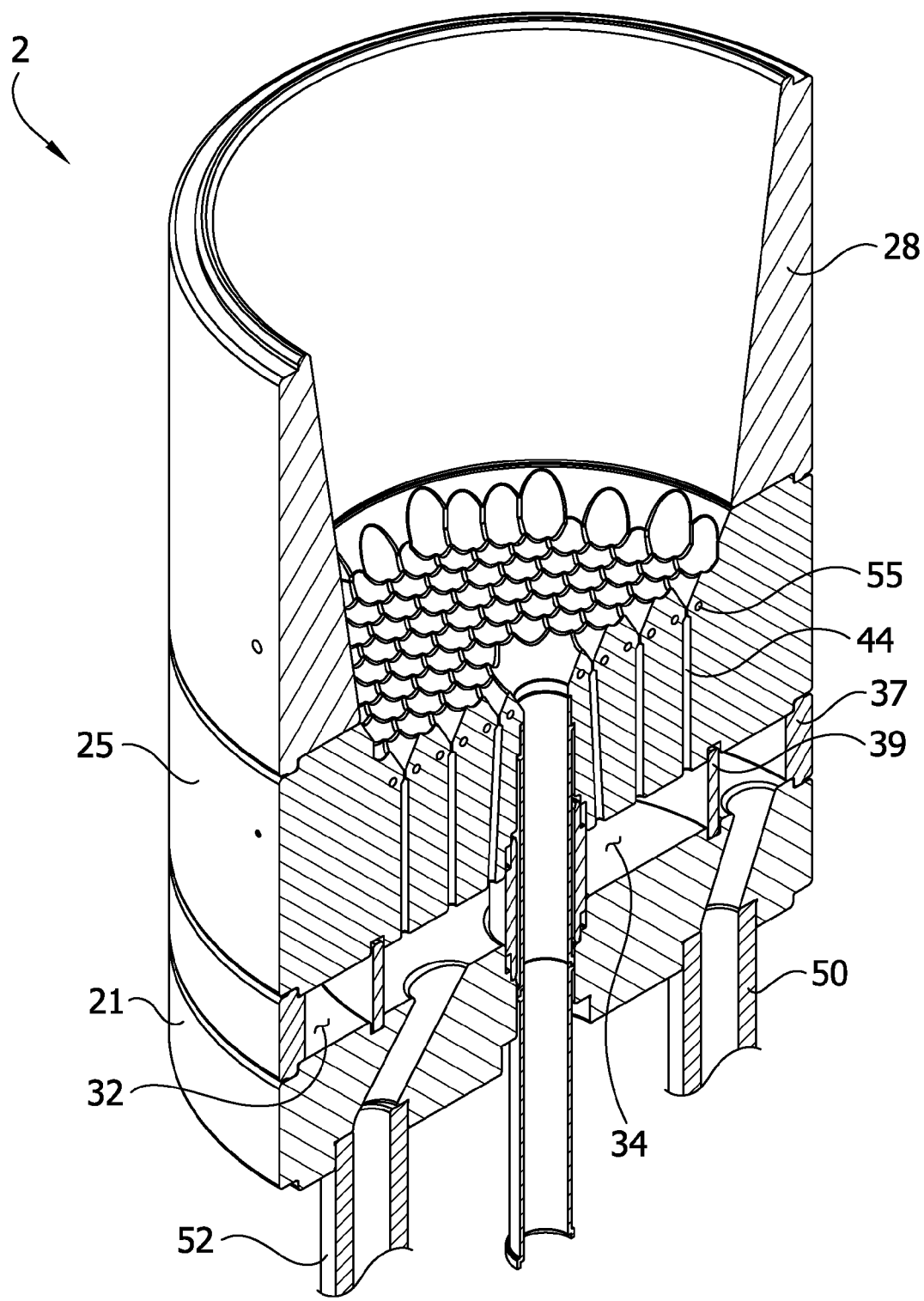
FIG. 6 is a perspective longitudinal section of the gas distribution unit.

The bottom view of the distributor 25 is illustrated in FIG. 4 and the top view of the distributor 25 is illustrated in FIG. 5. As can be seen from FIG. 4, the peripheral openings 42 are spaced from the interior openings 44 at the bottom of the distributor. As can be seen from FIG. 2, the peripheral openings 42 have channels 60 that angle toward the interior openings 44 from the bottom to the top of the distributor 25, and throttle portions 62 and flare-out portions 64 that are parallel with a longitudinal axis of the distributor 25. As can be seen from FIG. 5, the peripheral openings 42 are adjacent to the interior openings 44 at the top of the distributor 25.

A second embodiment of a fluidized bed reactor and distributor is shown in FIGS. 7-12. The distribution unit 102 of the reactor shown in FIGS. 7-12 generally allows a third gas to be introduced into the reaction chamber to allow more flexibility in processing and fluidized bed reactor operations. In this regard, it should be noted that parts or features of the reactor and distribution unit shown in FIGS. 7-12 that are analogous to those of the reactor system 1 and distribution unit 2 shown in FIGS. 1-6 are designated by the corresponding reference numeral of FIGS. 1-6 plus "100" (e.g., part 2 becomes part 102). It should be understood that reference is made to the description of the reactor system 1 and distribution unit 2 shown in FIGS. 1-6 above when any corresponding part in FIGS. 7-12 is not independently described below for all relevant and consistent purposes. Further, it should be understood that as the reaction system of FIGS. 1-6 may be referred to herein as a "two-gas" system and the reactor system of FIGS. 7-12 may be referred to herein as a "three-gas" system, the terms "two-gas" and "three gas" refer to distinct mixtures of gases rather than distinct compounds (e.g., the two-gas system includes use of two distinctly different gases and more than two gaseous compounds may be used).

Figure 7:
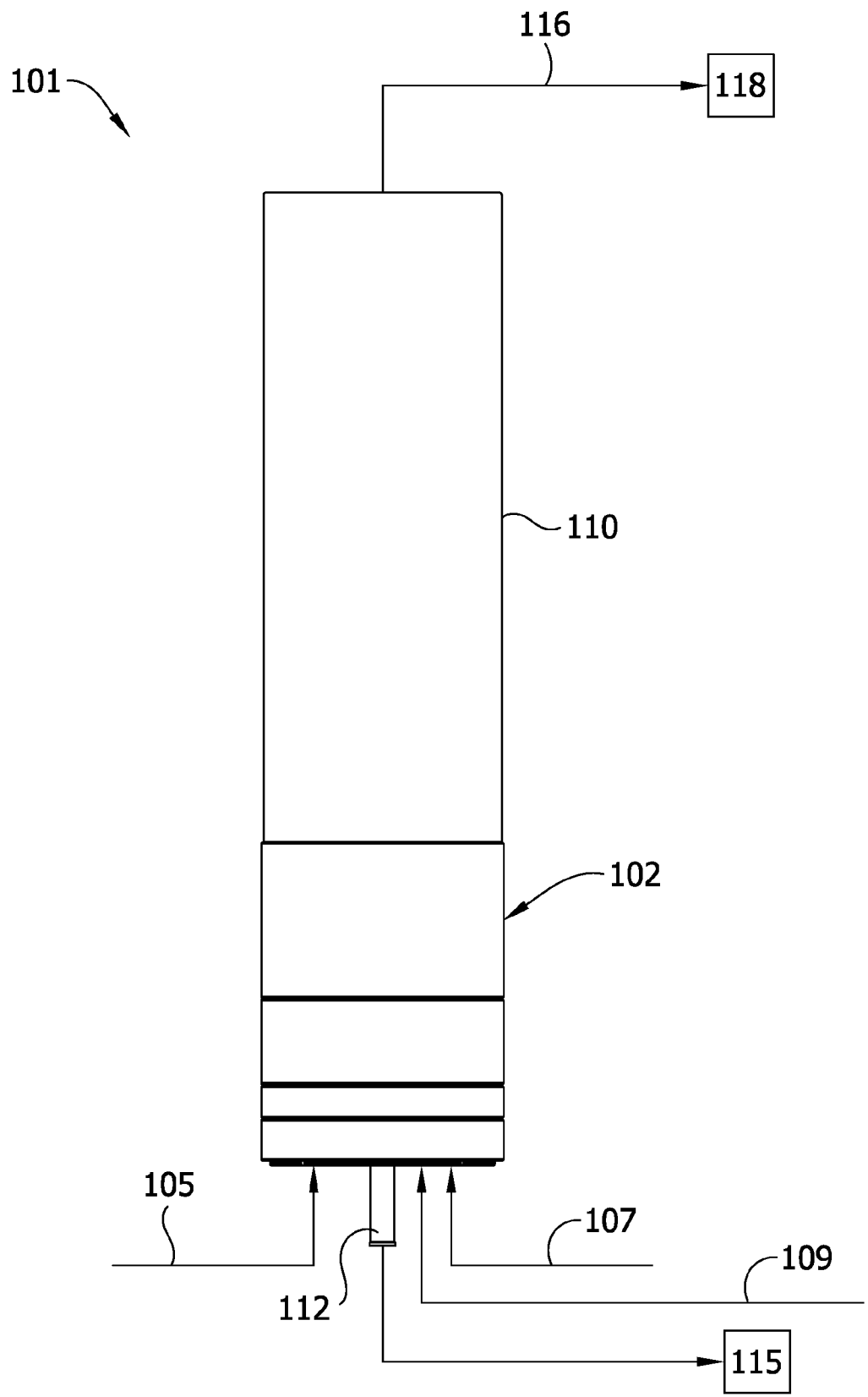
FIG. 7 is a schematic of the flows entering and exiting a second embodiment of a fluidized bed reactor system.

Referring now to FIG. 7, a source of third gas 109 is introduced into the distribution unit 102 with the source of first gas 105 and the source of second gas 107. Generally, the "third gas" is a gas with a different composition than the "first gas" and "second gas" and vice versa. The first, second and third gases may contain a plurality of gaseous compounds as long as the mass composition or molar composition of at least one of the compounds in the first gas is different than the composition of that compound in the second gas and third gas and as long as the mass composition or molar composition of at least one of the compounds of the second gas is different than the composition of that compound in the first gas and third gas.

Figure 8:
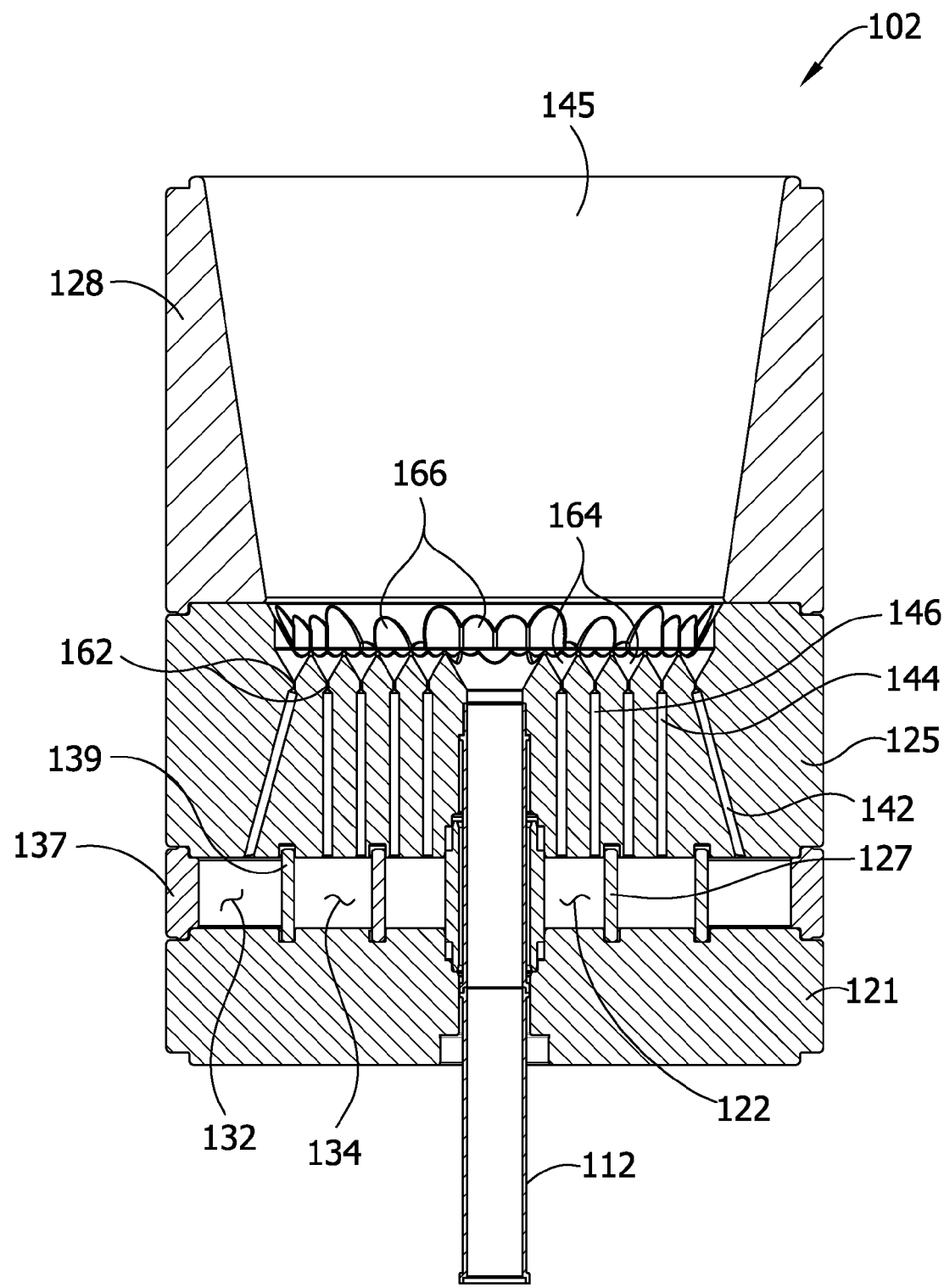
FIG. 8 is a longitudinal section of a second embodiment of a gas distribution unit.

Referring now to FIG. 8, an outer ring 137, concentric interior ring 139 and concentric central ring 127 are located between the inlet block 121 and distributor 125. A first gas plenum 132 is defined between the outer ring 137 and the interior ring 139 and a second gas plenum 134 is defined between the interior ring 139 and the central ring 127. A third gas plenum 122 is defined between the central ring 127 and the concentric product recovery tube 112 that extends below the inlet block 121.

A series of peripheral distribution openings 142, interior distribution openings 144 and central distribution openings 146 are located within the distributor 125. As used herein, "central distribution openings" or "central openings" refer to distributor openings that are generally interior to the interior openings. The peripheral openings 142 are in fluid communication with the first gas plenum 132 and the reaction chamber 110. The interior openings 144 are in fluid communication with the second gas plenum 134 and the reaction chamber 110. The central openings 146 are in fluid communication with the third gas plenum 122 and the reaction chamber 110. Generally, the peripheral openings 142 are not in fluid communication with the second gas or third gas, the interior openings 144 are not in fluid communication with the first gas or third gas and the central openings are not in fluid communication with the first gas or second gas.

In embodiments wherein the first or second gas is reactive with the third gas, configuring the central openings to be in fluid communication with the third gas allows the reaction to be delayed until the third gas is well mixed with the first gas or second gas which is typically downstream of the distributor 125 and liner chamber 145. This may effectively limit deposition of material (e.g., silicon) onto the distributor 125 or taper liner 128. This configuration also allows at least one of the first, second or third gases to be introduced into the reaction chamber 110 at a temperature different than the other gases to provide further processing flexibility. For instance in the polycrystalline silicon process described below, the second gas (e.g., trichlorosilane) may be introduced at a temperature much less the first gas (e.g., silicon tetrachloride) and third gas (hydrogen). This configuration delays the second gas from reaching its deposition temperature until it has passed downstream from the distributor 125 and liner chamber 145 to the reaction chamber 110. By heating one or more of the gases to a temperature much higher than the other reacting gas, it is possible to minimize or possibly even eliminate application of extraneous heat applied to the reaction chamber walls.

In some embodiments, a portion of the peripheral openings are in fluid communication with the second gas and/or third gas, a portion of the interior openings are in fluid communication with the first gas and/or third gas and/or a portion of the central openings are in fluid communication with the first gas and/or second gas. Similar to the two-gas system described above, in these embodiments, generally the percentage of the peripheral openings in fluid communication with the first gas is greater than the percentage of interior openings in fluid communication with the first gas and the percentage of central openings in fluid communication with the first gas. Similarly, the percentage of the interior openings in fluid communication with the second gas is greater than the percentage of peripheral openings and central openings in fluid communication with the second gas and the percentage of central openings in fluid communication with the third gas is greater than the percentage of peripheral openings and interior openings in fluid communication with the third gas.

Figure 9:
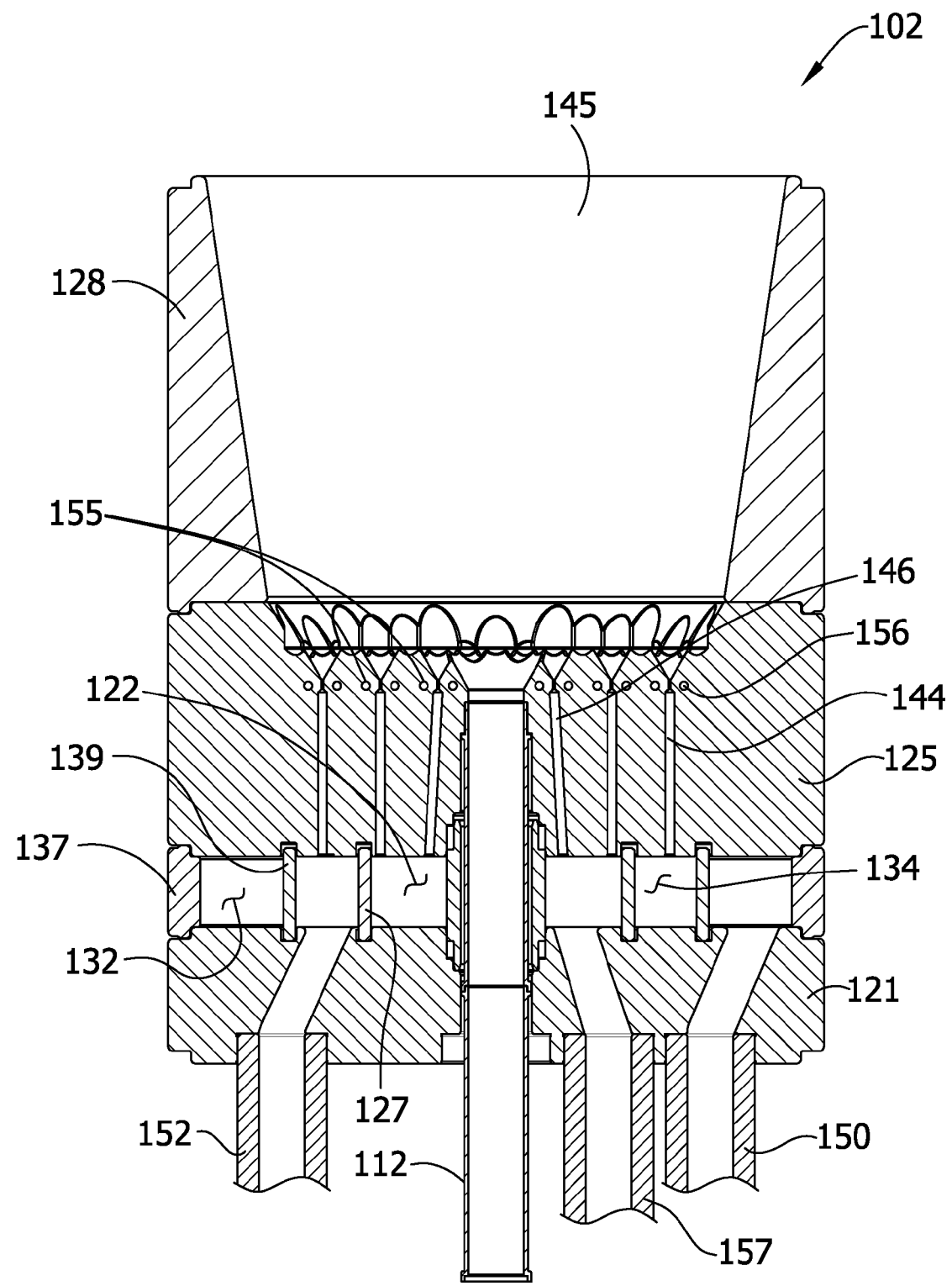
FIG. 9 is a second longitudinal section of the gas distribution unit.
Figure 10:
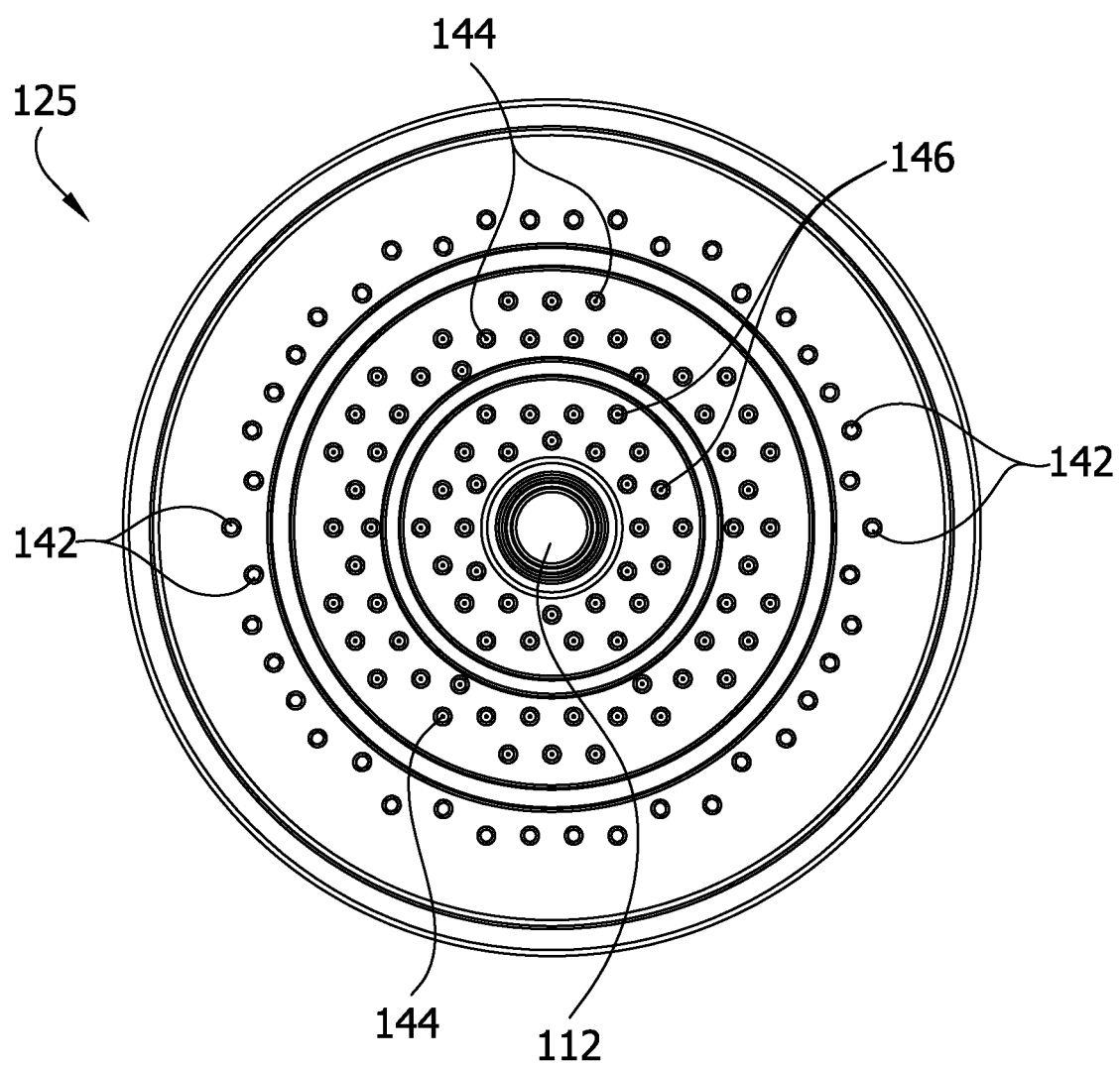
FIG. 10 is a bottom view of the distributor of the gas distribution unit.
Figure 11:
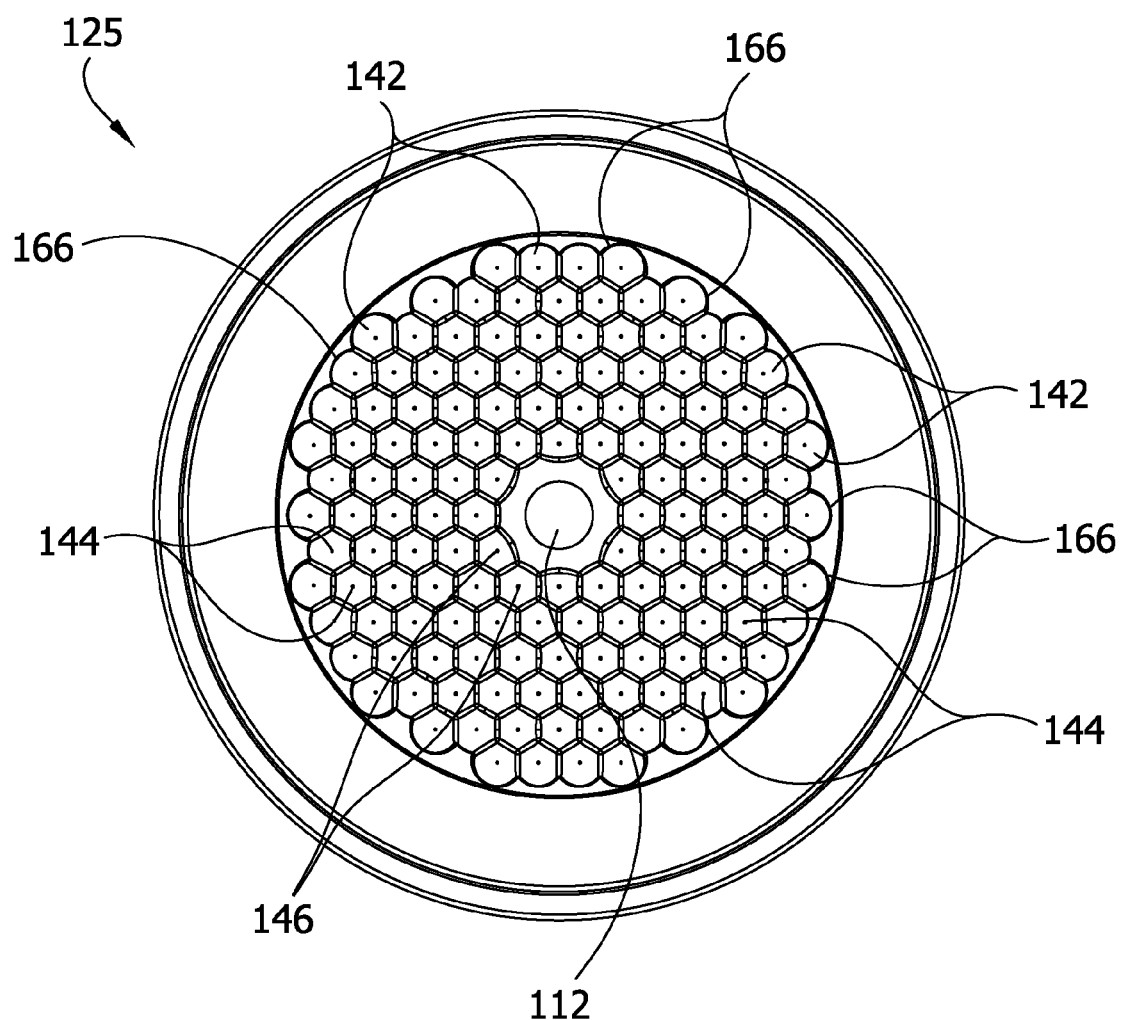
FIG. 11 is a top view of the distributor of the gas distribution unit.
Figure 12:
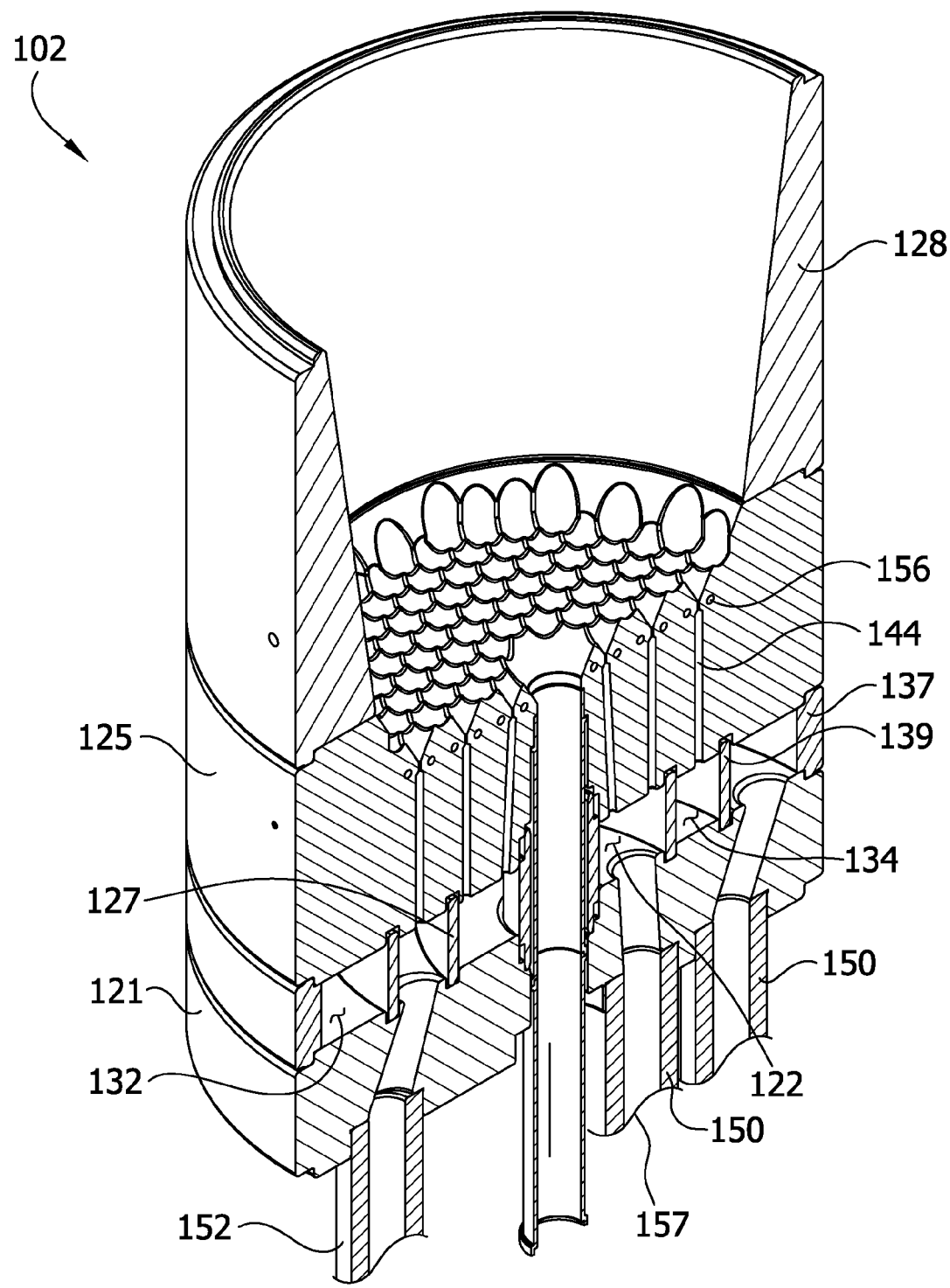
FIG. 12 is a perspective longitudinal section of the gas distribution unit.

Referring now to FIG. 9, a first gas inlet tube 150 extends through the inlet block 121 and is in fluid communication with the first gas plenum 132 and a source of first gas (not shown). A second gas inlet tube 152 extends through the inlet block 121 and is in fluid communication with the second gas plenum 134 and a source of second gas (not shown). A third gas inlet tube 157 extends through the inlet block 121 and is in fluid communication with the third gas plenum 122. Cooling channels 155, 156 in the distributor 125 may be arranged such that one or more of the first, second and third gases are cooled. Central cooling channels 155 may be used to cool the third gas supplied to the third gas plenum 122 as the gas passes through the central distribution openings 146 and interior cooling channels 156 may be used to cool the second gas supplied from the second gas plenum 134 as it passes through the interior distributor openings 144. In one or more embodiments, the central cooling channels 155 and/or interior cooling channels 156 may actually act as heating channels to heat one or more of the second or third gases by circulating hot gas or liquid through the channels depending on the particular reactions that occur in the reaction chamber. The distributor 125 may optionally include further cooling channels (not shown) to cool the first gas as it passed through the peripheral distributor openings 142 (FIG. 8).

In this regard, while the distribution unit 102 of the reactor shown in FIGS. 7-12 is configured for distribution of three gases into the reactor, the distribution unit 102 may be modified to supply more than three distinct gases to the reactor by use of additional gas plenums and distribution openings. Such modified distribution units are considered to be within the scope of the present disclosure.

II. Process for Producing Polycrystalline Silicon

Figure 13:
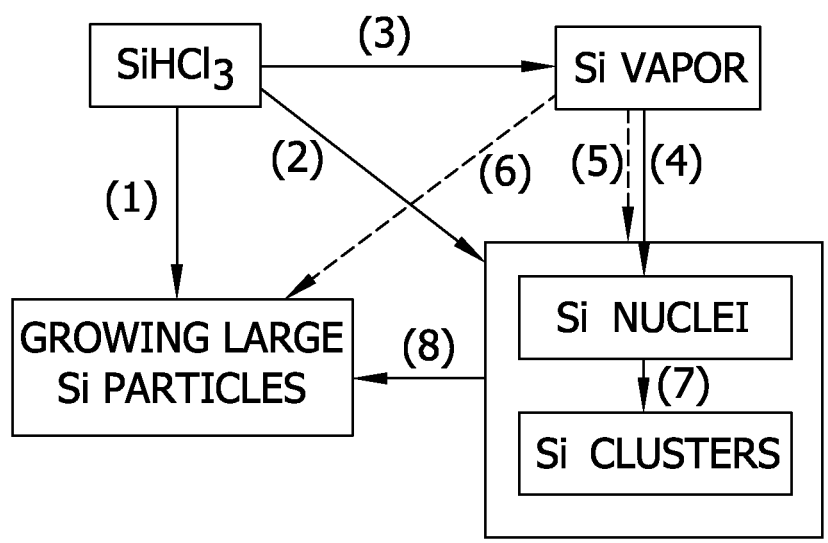
FIG. 13 is a schematic depiction of reaction mechanisms that take place in a granular polycrystalline silicon reactor system.

In accordance with embodiments of the present disclosure, polycrystalline silicon may be produced by thermal decomposition of one or more silicon-containing compounds (synonymously "thermally decomposable silicon compounds") in a fluidized bed reactor. The process of the present disclosure includes introducing a feed gas including a gaseous silicon compound capable of being thermally decomposed into a reactor. The feed gas is heated in the reaction chamber to cause at least a portion of the silicon in the silicon compound to deposit, by chemical vapor deposition, onto the silicon particles in the reaction chamber, thereby growing the silicon particles into larger particles typically referred to as granular polysilicon. A variety of reactions may take place in the reaction chamber. The reaction mechanisms believed to occur in a trichlorosilane fluidized bed reactor systems are generally illustrated in FIG. 13. In this regard, it should be noted that these mechanisms in no way limit embodiments of the present disclosure as they do not constitute the entire set of reactions which might take place in the reactor system.

With reference to FIG. 13, in a trihalosilane system and, in particular, a trichlorosilane system, silicon heterogeneously deposits onto the growing silicon particles (1). Trichlorosilane may also decompose to produce silicon vapor (3) which can homogenously nucleate to form undesirable silicon dust (synonymously silicon "fines" or "powder") (4) and which can deposit on the growing silicon particle (6). The silicon fines can grow in size by deposition of silicon from trichlorosilane (2) or from any silicon vapor (5). The fines can combine to form larger fines (7). Silicon fines can agglomerate with growing silicon particles (8). The agglomeration is caused by bombardment of the fines and particles. Without being bound to a particular theory, it is believed that once the fines contact the particles they agglomerate due to the applicable molecular forces.

Deposition of silicon from halosilanes (e.g., trichlorosilane) is believed to occur by one or more of reaction (i) or reaction (ii) shown below,

$$SiHX_3 + H_2 \rightarrow Si + 3HX \quad (i),$$

$$4SiHX_3 \rightarrow Si + 3SiX_4 + 2H_2 \quad (ii),$$

wherein X is a halogen such as chlorine. It should be noted that while reaction (ii) is a thermal decomposition reaction and reaction (i) may be characterized as a hydrogen reduction reaction, both reactions (i) and (ii) are generally referenced herein as involving a "thermal decomposition" of trihalosilane.

In accordance with fluidized bed reactor operations for producing polycrystalline silicon granular product, polycrystalline silicon seed particles may be added to the reaction chamber to initiate deposition of silicon. The particle sizes of the seed particles may be from about 50 nm to about 800 nm and are more typically from about 250 nm to about 600 nm. Two types of silicon seed particles are commonly used to initiate silicon deposition. Silicon seed particles provided by grinding or breaking product particles collected from the reactor to a typical particle size from about 250 nm to about 350 nm may be used. Alternatively or in addition, small polycrystalline particles gathered with and separated from the granular polycrystalline product having a particle size of from about 500 nm to about 600 nm may be used as seed particles.

A. Feed Gases Containing One or More Thermally Decomposable Silicon Compounds

The process for producing polycrystalline silicon will now be described with reference to the fluidized bed reactor system 1 illustrated in FIG. 1. A gas containing one or more thermally decomposable compounds 7 (e.g., trihalosilane) and a gas containing silicon tetrahalide 5 are fed from their respective source to the reactor system 1. Thermally decomposable silicon compounds include compounds generally capable of being thermally decomposed to produce silicon. Additional products may be produced from the decomposition process, without departing from the scope of the present disclosure, as long as the thermally decomposable compound provides a source of silicon to grow the polysilicon particles to form polysilicon granules. Thermally decomposable silicon compound gases include all gases containing silicon, that can be heterogeneously deposited by chemical vapor deposition, such as silicon tetrahydride (commonly referred to as silane), any of the trihalosilanes and any of the dihalosilanes. Suitable halogens which may be used in such silicon halides include chlorine, bromine, fluorine and iodine. In some embodiments, one or more trihalosilanes selected from trichlorosilane, tribromosilane, trifluorosilane and triiodosilane are used as the thermally decomposable silicon compound In this regard it should be understood that, as used herein, "thermally decomposable silicon compounds" do not include silicon tetrahalides (e.g., silicon tetrachloride) as silicon tetrahalide is introduced into the reaction chamber to etch silicon deposits on the reactor walls. Accordingly, a thermally decomposable silicon compound other than silicon tetrahalide is fed to the reactor along with an amount of silicon tetrahalide. In some embodiments, trihalosilane (e.g., trichlorosilane) is introduced into the reactor as the thermally decomposable silicon compound.

The thermally decomposable compound may be introduced into the reactor without dilution or the gas may be diluted with a carrier gas such as hydrogen, argon, helium or combinations thereof. When a trihalosilane compound is used as a thermally decomposable compound, hydrogen may be used as a carrier gas as hydrogen gas reacts with trihalosilane in the decomposition reaction as shown in reaction (i) above. In various embodiments of the present disclosure, the concentration of the thermally decomposable compound (e.g., or of trihalosilane when trihalosilane is used as the thermally decomposable compound) by volume in the gases fed to the reactor (e.g., as through the interior openings of the distributor) is at least about 5%, at least about 20%, at least about 40%, at least about 55%, at least about 70%, at least about 95%, at least about 99% or from about 40% to about 100%, from about 55% to about 95% or from about 70% to about 85%. Further, the concentration of carrier gas (e.g., hydrogen) by volume in this gas (e.g., the gas fed through the interior openings of the distributor) may be at least about 1%, at least about 5%, at least about 20%, at least about 40%, at least about 60%, at least about 80% or from about 1% to about 90%, from about 20% to about 90% or from about 40% to about 90%. The molar ratio of carrier gas (e.g., hydrogen) to thermally decomposable compound (e.g., or of trihalosilane when trihalosilane is used as the thermally decomposable compound) may be from about 1:1 to about 7:1, from about 2:1 to about 4:1 or from about 2:1 to about 3:1.

The thermally decomposable silicon compound may be added to the reactor below temperatures at which the compound decomposes to prevent deposition of silicon onto the distributor and distributor openings. The temperature of the thermally decomposable silicon may vary and depend on the available heat from other gases introduced into the reactor and the amount of extraneous heat applied through the reactor walls. In general, the thermally decomposable compound (e.g., trichlorosilane) may be added to the reactor at a temperature of less than about 1100° C., less than about 1000° C., less than about 900° C., less than about 800° C., less than about 600° C., less than about 400° C., less than about 200° C. or from about room temperature (e.g., 20° C.) to about 1100° C., from about room temperature (e.g., 20° C.) to about 800° C., from about room temperature (e.g., 20° C.) to about 600° C., from about room temperature (e.g., 20° C.) to about 400° C. or from about room temperature (e.g., 20° C.) to about 200° C. In the case of trichlorosilane, trichlorosilane may be added from about room temperature (e.g., 20° C.) to about 400° C. or from about room temperature (e.g., 20° C.) to about 300° C. As explained below, the thermally decomposable compound may be heated upon addition to the reaction chamber.

B. Reaction Chamber and Reaction Conditions

The process of the present disclosure may carry out the reaction in a single fluidized bed reactor or may incorporate one or more fluidized bed reactors configured in series or in parallel. The fluidized bed reactors may be operated in a continuous manner in which feed and product are continually introduced and withdrawn from the reactor or in a batch process without departing from the scope of the present disclosure.

The reaction chamber is typically a fluidized bed in which silicon particles are suspended by an upward flow of the fluidizing gas in the reactor. Fluidized bed reactors provide high mass transfer and heat transfer rates between growing silicon particles and the gas phase which enhances the deposition rate of silicon onto the particles. The fluidized bed reactor is generally a cylindrical vertical vessel; however, it should be understood that any configuration that is acceptable to fluidized bed operations may be utilized. The particular dimensions of the reactor will be primarily dependent upon system design factors that may vary from system to system such as the desired system output, heat transfer efficiencies, system fluid dynamics and the like, without departing from the scope of the present disclosure.

Extraneous heat may be applied to the walls of the reaction chamber to cause the temperature of the thermally decomposable gas to increase to the point at which the gas decomposes. Methods for heating include, for example, capacitive heating, induction coils and electrical resistance elements. In certain embodiments, heat is not applied to the reaction chamber as one or more of the feed gases may be heated before addition to the reaction chamber.

Referring now to FIG. 3, silicon tetrahalide (e.g. silicon tetrachloride) is fed through the first gas inlet tube 50 and proceeds to the first gas plenum 32. From the first gas plenum 32 silicon tetrahalide passes through a series of peripheral distribution openings 42 (FIG. 2) and into the liner chamber 45 and reaction chamber 10 (FIG. 1). Suitable silicon tetrahalides include, for example, silicon tetrachloride, silicon tetrabromide, silicon tetrafluoride and silicon tetraiodide. Other gases may be fed with the silicon tetrahalide into the first gas plenum 32 without departing from the scope of the present disclosure.

The thermally decomposable compound (e.g., trihalosilane such as trichlorosilane) is fed through the second gas inlet tube 52 and proceeds to the second gas plenum 34. A gas other than the thermally decomposable compound (e.g., an amount of carrier gas such as hydrogen) may be fed with the thermally decomposable compound through the second gas inlet tube 52 without departing from the scope of the present disclosure. From the second gas plenum 34 the thermally decomposable compound passes through a series of interior distribution openings 44 and into the liner chamber 45 and reaction chamber 10 (FIG. 1). Because silicon tetrahalide enters the reaction chamber 10 near the reaction chamber wall (and enters the liner chamber 45 near the taper liner 28), relatively small amounts of thermally decomposable compounds contact the reaction chamber wall. This arrangement prevents undesirable build-up of silicon on the reactor wall.

Furthermore, it has been found that silicon tetrahalides such as silicon tetrachloride may actually etch silicon deposits that have already formed on the reactor wall. In the case of silicon tetrachloride, at temperatures above about 1000° C. it is believed that silicon tetrachloride predominantly reacts with silicon (e.g., silicon deposits on the reactor wall) according to reaction (iii) shown below:

$$6SiCl_4 + 2Si \rightarrow 4Si_2Cl_6 \qquad \text{(iii).}$$

Figure 14:
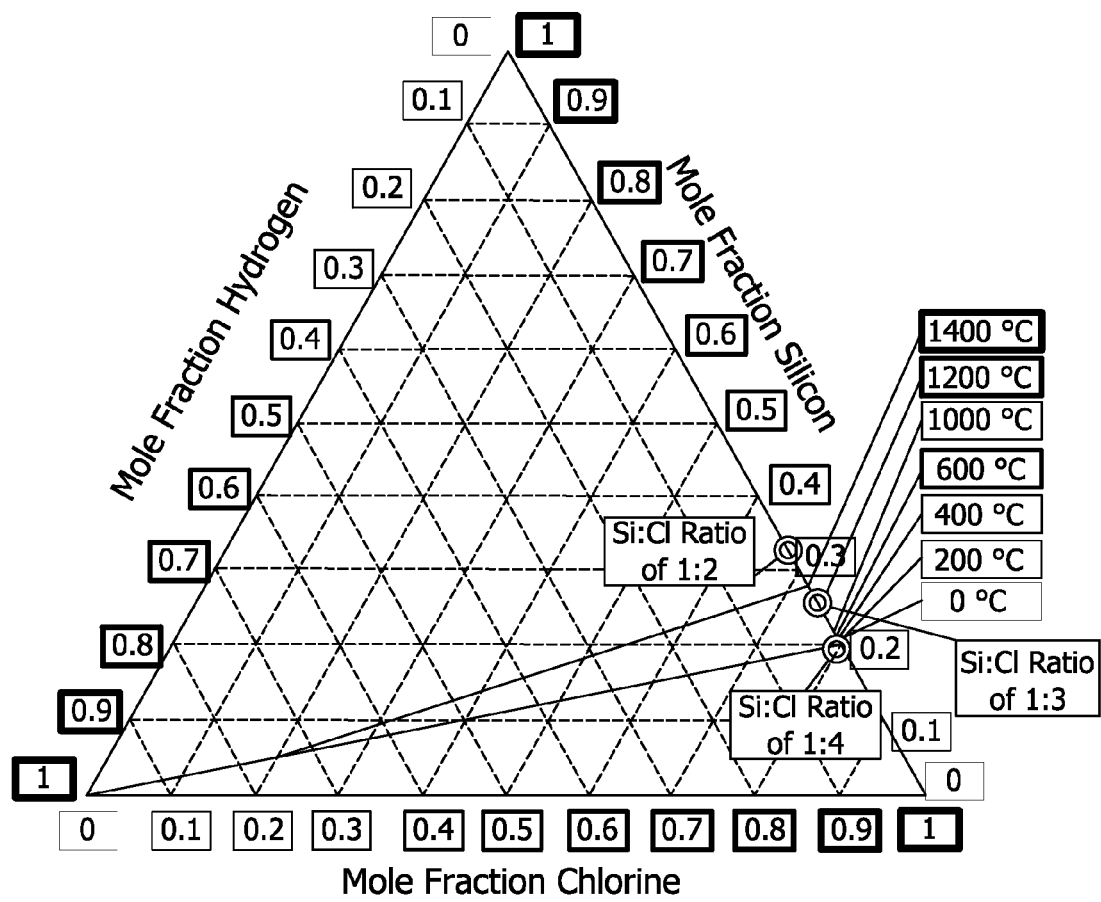
FIG. 14 is a graph of the triaxial molar equilibrium of a silicon, chlorine and hydrogen gas system.

The equilibrium triaxial chart for silicon, chlorine and hydrogen vapor is shown in FIG. 14. It is generally believed that because silicon tetrachloride is added to the reactor along the reactor walls, silicon tetrachloride (and any carrier gas for silicon tetrachloride) is largely the only gas that contacts the walls of the reactor and hydrogen is not present at the reactor walls even when added with trichlorosilane. In this regard, FIG. 14 may be viewed as if hydrogen-containing compounds are absent. As can be seen from FIG. 14, as the reactor temperature increases, smaller vapor-phase molecular ratios of silicon to chlorine are favored (i.e., a higher vapor-phase amount of silicon is favored) which allows the silicon deposits to be etched. In this manner, silicon tetrachloride may behave as an etching gas rather than a deposition gas at relatively higher temperatures.

In this regard, reaction (iii) should not be viewed in a limiting sense as other reactions may occur and reaction (iii) may occur at temperatures other than as described. In general, it should be understood that silicon tetrachloride acts as an etchant in the absence of hydrogen so as to etch silicon deposits on the reactor walls at temperatures above about 1000° C. In one or more embodiments in which silicon tetrachloride is selected for use, silicon tetrachloride may enter the reaction chamber at a temperature of at least about 1000° C., at least about 1100° C., at least about 1200° C., at least about 1300° C. or at least about 1400° C. Generally, the silicon tetrachloride is introduced at a temperature that does not cause the reactor walls to be overheated or that heats the fluidized silicon to or above its melting temperature of 1414° C. In one or more embodiments, the temperature at which silicon tetrachloride is added to the reaction chamber is from about 1000° C. to about 1600° C., from about 1000° C. to about 1500° C., from about 1100° C. to about 1500° C. or from about 1200° C. to about 1400° C. It this regard, the temperature ranges recited above may also be used for silicon tetrahalides other than silicon tetrachloride.

The gas introduced into the reaction chamber through the peripheral openings may contain an amount of gaseous compounds other than silicon tetrahalide compounds. Generally, however the silicon tetrahalide contains little or even substantially no amount of hydrogen as hydrogen may promote deposition of silicon on the reactor walls. Other compounds that may be introduced with silicon tetrahalide gas include thermally decomposable silicon compounds (e.g., trichlorosilane) or compounds that are inert relative to thermally decomposable silicon compounds and silicon tetrahalides such as argon and nitrogen. In one or more of these embodiments, the concentration of silicon tetrahalide by volume in the gas fed through the peripheral openings is at least about 1%, at least about 5%, at least about 20%, at least about 40%, at least about 60%, at least about 80%, at least about 95%, at least about 99% or from about 1% to about 100%, from about 20% to about 100% or from about 40% to about 100%. The concentration of the thermally decomposable silicon compounds (other than silicon tetrahalide which may deposit an amount of silicon upon contact with hydrogen) by volume in the gas fed through the peripheral openings may be less than about 50%, less than about 30%, less than about 5% or from about 1% to about 50% or from about 5% to about 30%. In some embodiments, the gas fed through the peripheral openings of the distributor does not contain gases other than silicon tetrahalide or contains only minor parts of other gases (e.g., less than about 1% or less than about 0.1% by volume).

In this regard, it should be understood that it may be desirable to add an amount of hydrogen as a carrier gas for the thermally decomposable compound distributed through the central distribution openings. If silicon tetrahalide is introduced into the reactor at a very high temperature and if there are no silicon deposits on the reactor wall, silicon tetrahalide may etch the reactor lining, particularly if the lining is composed of silicon (e.g., CVD silicon). Increasing amounts of hydrogen cause silicon tetrahalides to act more as a deposition gas and less as an etching gas, thereby protecting the reactor liner. As stated above, the amount of hydrogen by volume in the gas fed through the central distribution openings may be at least about 1%, at least about 5%, at least about 20%, at least about 40%, at least about 60%, at least about 80% or from about 1% to about 90%, from about 20% to about 90% or from about 40% to about 90%.

In various embodiments of the present disclosure, the concentration of the thermally decomposable compound (e.g., or of trihalosilane when trihalosilane is used as the thermally decomposable compound) by volume in the gases fed to the reactor (e.g., as through the interior openings of the distributor) is at least about 5%, at least about 20%, at least about 40%, at least about 55%, at least about 70%, at least about 95%, at least about 99% or from about 40% to about 100%, from about 55% to about 95% or from about 70% to about 85%. Further, the concentration of carrier gas (e.g., hydrogen) by volume in this gas (e.g., the gas fed through the interior openings of the distributor) may be at least about 1%, at least about 5%, at least about 20%, at least about 40%, at least about 60%, at least about 80% or from about 1% to about 90%, from about 20% to about 90% or from about 40% to about 90%. The molar ratio of carrier gas (e.g., hydrogen) to thermally decomposable compound (e.g., or of trihalosilane when trihalosilane is used as the thermally decomposable compound) may be from about 1:1 to about 5:1 or from about 2:1 to about 3:1.

According to another embodiment of the present disclosure, the silicon tetrahalide 5 fed through the peripheral distribution openings 42 may contain an amount of the thermally decomposable compounds and/or the thermally decomposable gas 7 fed through the interior distribution openings 44 may contain an amount of silicon tetrahalide. In these embodiments the concentration of silicon tetrahalide in the gas fed through the peripheral openings exceeds the concentration of silicon tetrahalide in the gas fed through the interior openings to reduce the amount of silicon which deposits on the reactor wall.

Referring now to FIGS. 7-12, in various embodiments, a fluidized bed reactor system that allows three distinct gas streams to be introduced into the reaction chamber may be used for production of polycrystalline silicon. This design allows hydrogen to be introduced into the reaction chamber inward of the thermally decomposable silicon compounds. Similar to the reactor system of FIGS. 1-6, a first gas containing one or more silicon tetrahalides is fed through the first gas inlet tube 150 and proceeds to the first gas plenum 132 and through a series of peripheral distribution openings 142 and into the liner chamber 145 and reaction chamber 110. A second gas containing a thermally decomposable compound (e.g., a trihalosilane such as trichlorosilane) is fed through the second gas inlet tube 152 and proceeds to the second gas plenum 134 and a series of interior distribution openings 144 and into the liner chamber 145 and reaction chamber 110. A third gas containing hydrogen may be fed through the third gas inlet tube 157 and proceeds to a third gas plenum 122 and a series of central distribution openings 146 and into the liner chamber 145 and reaction chamber 110. Generally the central openings 146 are closer to the centerpoint of the distributor 125 than the interior openings 144 and the peripheral openings 142 and the interior openings are generally closer to the centerpoint than the peripheral openings. The concentration of hydrogen in the gas fed through the central openings 146 generally exceeds the concentration of hydrogen in the gas fed through the interior openings 144 and the concentration of gas fed through the peripheral openings 142.

The hydrogen gas introduced through the central distribution openings 146 may be at a temperature above the thermally decomposable silicon compound introduced through the interior openings 144. In this regard, the hydrogen gas may be used to heat the thermally decomposable silicon compound as the gases mix and pass vertically through the reaction chamber and the amount of extraneous heat that must be applied through the walls of the reaction chamber is reduced or may even be eliminated.

In one or more embodiments, the hydrogen gas may be introduced into the reaction chamber at a temperature of at least about 1000° C., at least about 1100° C., at least about 1200° C., at least about 1300° C., at least about 1400° C., from about 1000° C. to about 1500° C., from about 1100° C. to about 1500° C. or from about 1200° C. to about 1500° C. Additionally or alternatively, silicon tetrahalide may be added at a temperature above the thermally decomposable silicon compounds. For instance, the silicon tetrahalide may be added within the range of temperatures described above for a two-gas system. By introducing the thermally decomposable gas at a temperature below the hydrogen gas and/or the silicon tetrahalide gas, the thermally decomposable compounds may be maintained at a temperature below which the compounds decompose as the gas passes through the distributor 125 and taper liner 128. For instance, the thermally decomposable compound may be added to the reaction chamber at a temperature of less than about 1100° C., less than about 1000° C., less than about 900° C., less than about 800° C., less than about 600° C., less than about 400° C., less than about 200° C. or from about room temperature (e.g., 20° C.) to about 1100° C., from about room temperature (e.g., 20° C.) to about 800° C., from about room temperature (e.g., 20° C.) to about 600° C., from about room temperature (e.g., 20° C.) to about 400° C. or from about room temperature (e.g., 20° C.) to about 300° C. In the case of trichlorosilane, trichlorosilane may be added from about room temperature (e.g., 20° C.) to about 400° C. or from about room temperature (e.g., 20° C.) to about 300° C.

During decomposition, by-product hydrogen halide acid (e.g., HCl) is produced which may be used to generate further trihalosilane feed gas. In embodiments where silane is used as a thermally decomposable compounds, hydrogen is produced that may be recycled for use as a carrier gas for additional quantities of thermally decomposable feed gas in the operation of the reactor system.

During operation of the reactor system (either the two-gas system or three-gas system described above), the gas velocity through the reaction zone is maintained above the minimum fluidization velocity of the silicon particles. The gas velocity through the reactor is generally maintained at a velocity of from about one to about eight times the minimum fluidization velocity necessary to fluidize the particles within the fluidized bed. In some embodiments, the gas velocity is from about two to about five times, and in at least one embodiment is about four times the minimum fluidization velocity necessary to fluidize the particles within the fluidized bed. The minimum fluidization velocity varies depending on the properties of the gas and particles involved. The minimum fluidization velocity may be determined by conventional means (see, for example, p. 17-4 of Perry's Chemical Engineers' Handbook, 7th. Ed., incorporated herein by reference for all relevant and consistent purposes).

The minimum fluidization conditions may be calculated for conditions as they exist near the distribution unit. Using these conditions, which include temperatures that are normally cooler than the rest of the reactor, it is possible to ensure the minimum fluidization in the entire bed. Although the present disclosure is not limited to specific minimum fluidization velocities, minimum fluidization velocities useful in the present disclosure may range from about 0.7 cm/sec to about 350 cm/sec or even from about 6 cm/sec to about 150 cm/sec.

Gas velocities higher than the minimum fluidization flow rate are often desired to achieve higher productivities. As the gas velocity increases beyond the minimum fluidization velocity the excess gas forms bubbles, increasing the bed voidage. The bed can be viewed to consist of bubbles and "emulsion" containing gas in contact with silicon particles. The quality of the emulsion is quite similar to the quality of the bed at the minimum fluidization condition. The local voidage in the emulsion is close to the minimum fluidization bed voidage. Hence, bubbles are generated by the gas introduced in excess of what is required to achieve the minimum fluidization. As the ratio of actual gas velocity divided by the minimum velocity increases, the bubble formation intensifies. At a very high ratio, large slugs of gas are formed in the bed. As the bed voidage increases with the total gas flow rate, the contact between solids and gases becomes less effective. For a given volume of the bed, the surface area of solids in contact with reacting gases decreases with increasing bed voidage. Thus, for the given bed length, the conversion of thermally decomposable gas decreases. Conversion may also decrease with decreased gas residence time through the reaction chamber. In addition, different undesired reactions can take place at higher rates producing more fines.

In certain embodiments, extraneous heat is added to the reaction chamber such that the temperature in the reactor is maintained within the decomposition temperature range of the thermally decomposable compound and the melting point temperature of silicon. The temperature of the reactor may be maintained at above about 200° C., above about 700° C., above about 900° C. or even above about 1100° C. (e.g., from about 200° C. to about 1400° C., from about 900° C. to about 1100° C. or from above about 1000° C. to about 1100° C.). In this regard, it should be understood that the recited temperature ranges are suitable for any halogen chosen for use in the reactor; however, lower temperatures may be used if bromine is used (e.g., temperatures less than about 900° C.) and even lower temperatures may be used if iodine is chosen for use. The heat that is used to maintain the reaction zone at such temperatures may be provided by conventional heating systems such as electrical resistance heaters disposed on the exterior of the reactor vessel wall. In some embodiments, the pressure in the reactor is from about 1.25 atm to about 2.25 atm as measured at the top of the bed.

C. Systems for Producing Polycrystalline Silicon

Figure 15:
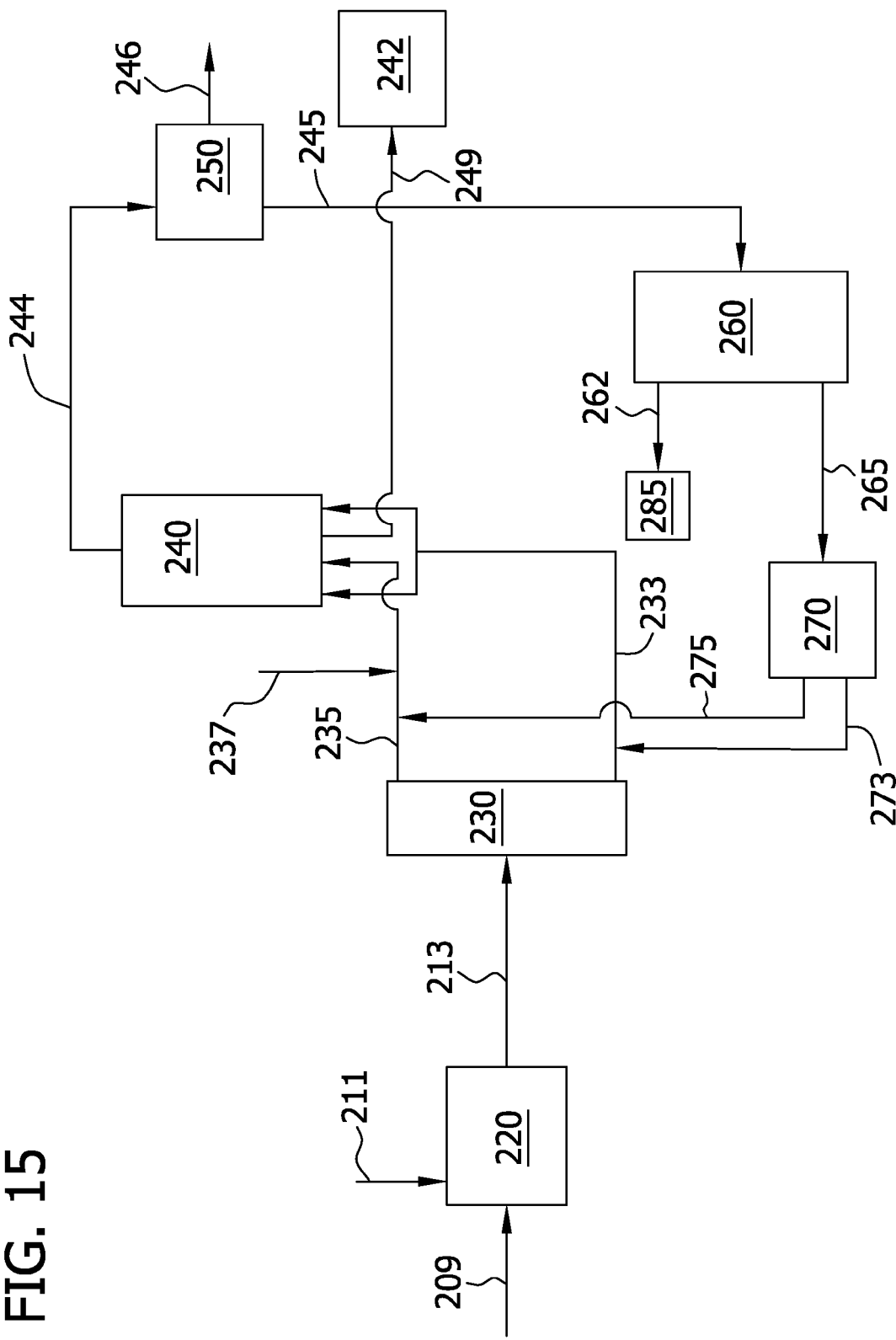
FIG. 15 is a schematic of the flows in a system for preparing polycrystalline silicon.

The two-gas fluidized bed reactor system of FIGS. 1-6 or the three-gas system of FIGS. 7-12 may be incorporated into a system for producing polycrystalline silicon from a silicon source (e.g., metallurgical grade silicon). An exemplary system is shown in FIG. 15. The system may be a substantially closed-loop system with regard to silicon tetrahalide in that the system does not require that silicon tetrahalide by-product be thermally converted to trihalosilane as in conventional methods.

According to the processing scheme of FIG. 15, trihalosilane (e.g., trichlorosilane) is introduced into the reaction chamber of a fluidized bed reactor to deposit silicon on growing silicon particles. An amount of silicon tetrahalide (e.g., silicon tetrachloride) is produced as a by-product and is discharged from the fluidized bed reactor. Silicon tetrahalide that is discharged from the fluidized bed reactor may be reintroduced to the reaction chamber (e.g., near the reaction chamber wall such as by introduction into peripheral openings of the distributor as described above) to etch silicon deposits in the reaction chamber. In one or more embodiments, the entire portion of silicon tetrahalide discharged from the reaction chamber is recycled back to the reaction chamber.

Additionally or alternatively and as shown in FIG. 15, a source of silicon may react with hydrogen halide (e.g., HCl) to produce trihalosilane, wherein an amount of by-product silicon tetrahalide is produced. This silicon tetrahalide (and in some embodiments the entire portion of this silicon tetrahalide) may also be added to the fluidized bed reactor to etch silicon deposits on the reaction chamber wall. In this regard, the system may be a substantially closed-loop system with regard to silicon tetrahalide as the amount of silicon tetrahalide produced from trihalosilane in the reaction chamber and the amount of silicon tetrahalide produced as a by-product of the reaction of silicon and hydrogen halide is substantially the same as the amount of silicon trihalosilane consumed in the reaction chamber by reaction with silicon.

With reference to FIG. 15, a source of silicon 209 may be reacted with an acid 211 (e.g., hydrochloric acid which is typically anhydrous hydrochloric acid) in an acid digester 220. Sources of silicon include sand (i.e., $SiO_2$), quartz, flint, diatomite, mineral silicates, metallurgical grade silicon (i.e., polycrystalline silicon), fused silica, fluorosilicates and mixtures thereof. Generally, the source of silicon is metallurgical grade silicon. Other materials (sand, quartz, flint, diatomite and the like) can be converted to metallurgical grade silicon according to a carbothermic reduction reaction. The reaction product 213 contains both trihalosilane and silicon tetrahalide. The reaction product 213 is typically a liquid at room temperature. Conventional processes typically include thermal conversion of the silicon tetrahalide to trihalosilane (e.g., conversion of silicon tetrahalide to silicon and hydrogen in further production of trichlorosilane or reaction of silicon tetrahalide with hydrogen and a source of silicon to produce trihalosilane). In contrast, in embodiments of the present disclosure, trihalosilane and silicon tetrahalide may be fed to the fluidized bed reactor. Optionally, trihalosilane and silicon tetrahalide may be fed to the fluidized bed reactor separately. For instance, silicon tetrahalide may be separated from the trihalosilane in a distillation column 230. Silicon tetrahalide may be fed to the fluidized bed reactor 240 by feeding the silicon tetrahalide 233 through peripheral distribution openings as described above such that silicon deposits on the walls of the reaction chamber may be etched. The trihalosilane 235 may be fed through interior openings with an amount of hydrogen 237 as described above in a two-gas system or with hydrogen being fed through central openings as described in a three-gas system.

Granular polycrystalline silicon 249 may be withdrawn from the fluidized bed reactor 240 and conveyed to product storage 242. Spent gas 244 may contain hydrogen halide acid (e.g., HCl) produced as a by-product of the trihalosilane decomposition process, as well as unreacted hydrogen, unreacted trihalosilane, silicon tetrahalide and small amounts of other by-product gases. The silicon tetrahalide may include silicon tetrahalide that was introduced into the fluidized bed reactor as an etching gas but did not react with silicon and silicon tetrahalide produced as a by-product of the thermal decomposition of trihalosilane as in reaction (ii) above.

The spent gas 244 may include an amount of silicon dust particulate that is carried out of the reactor. Typically, the size of the silicon dust particulate is less than about 50 µm and, in some embodiments, is less than about 5 µm. In contrast, granular polycrystalline product typically has a particle size of about 600 µm to about 2000 µm and more typically from about 800 µm to about 1200 µm or from about 900 µm to about 1000 µm. The silicon dust is separated from the spent gas 244 that exits the reactor in a solid-gas separation device 250 such as, for example, bag-filtration, cyclone separation or liquid scrubbers. Recovered silicon dust 246 may be sold for industrial use (e.g., as in a silicon charge for pulling single crystal silicon by the Cz method) or may be recycled back into the reactor and/or fed into one or more additional fluidized bed reactors wherein the silicon dust is at least partially scavenged by silicon particles.

The dust-depleted spent gas 245 may be cooled and condensed in one or more condensers 260 to remove hydrogen and hydrogen halide acid (collectively designated as "262"). The hydrogen and hydrogen halide acid 262 may be subjected to further processing 285 which may include introducing the gases into a wet scrubber to separate the acid from hydrogen gas. Any hydrogen may be recycled back to the fluidized bed reactor and the acid may be reacted with a source of silicon in the acid digester 220.

The remaining condensate 265 may be fed to a distillation column 270 wherein silicon tetrahalide 273 is separated from trihalosilane 275, both of which may be recycled back to the fluidized bed reactor 240. This is in contrast to conventional systems in which the silicon tetrahalide is thermally converted to trihalosilane.

Thus it can be seen that the system illustrated in FIG. 15 is a substantially closed loop system with regard to silicon tetrahalide. In this regard, silicon tetrahalide generated as part of trihalosilane production and silicon tetrahalide generated as a by-product gas in the fluidized bed reactor may both be consumed in the fluidized bed reactor such that no net silicon tetrahalide need be thermally converted to trihalosilane.

It should be understood that the system illustrated in FIG. 15 should not be viewed in a limiting sense as systems contemplated by the present disclosure include those with additional fluidized bed reactors, distillation columns and condensers including systems which use these units in series or parallel. Additional fluidized bed reactors, when present, may be operated according to the present disclosure or may be operated in more conventional means without departing from the scope of the present disclosure. Further, additional known processing steps may be included such as further separation and/or purification steps which may be readily determined by one of ordinary skill in the art. In one or more embodiments, the system of FIG. 15 may include one or more halogenation reactors to convert silicon tetrahalide to trihalosilane by reacting silicon tetrahalide with a source of silicon and hydrogen and may include further distillation columns to separate the reaction product gas into its constituent gases.

Furthermore, it should be understood that while the methods of the present disclosure have been described with regard to a fluidized bed reactor in which granular polysilicon is produced, the methods are also suitable in processing systems in which polysilicon rods are produced by chemical vapor deposition according to methods known in the art as the Siemens process. For instance, in the chemical vapor deposition process of the Siemens method, silicon tetrahalide may be directed to the reaction chamber wall and a thermally decomposable silicon compound directed inward of the silicon tetrahalide. Further, embodiments of the distributor and/or reactor systems described herein and shown in any of FIGS. 1-15 may be used in the Siemens process, particularly in embodiments wherein the walls of the Siemens reactor are insulated.

When introducing elements of the present disclosure or the embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above methods without departing from the scope of the disclosure, it is intended that all matter contained in the above description and shown in the accompanying figures shall be interpreted as illustrative and not in a limiting sense.

What is claimed is:

1. A distributor for distributing a first gas and a second gas and a third gas into a reaction chamber comprising at least one reaction chamber wall, the distributor comprising a plurality of distribution openings including a plurality of peripheral openings, a plurality of interior openings and a plurality of central openings, each distribution opening having a channel portion and a flare-out portion and a throttle portion disposed between the channel portion and flare-out portion, the peripheral openings having channel portions that are angled toward the interior openings from the bottom to the top of the distributor, and throttle portions and flare-out portions that are parallel with a longitudinal axis of the distributor, wherein the peripheral openings are configured to provide fluid communication with the source of first gas and not the source of second gas or the source of third gas.

2. The distributor as set forth in claim 1 wherein the central openings are configured to provide fluid communication with the source of third gas but not the source of first gas or the source of second gas.

3. The distributor as set forth in claim 1 wherein the interior openings are configured to provide fluid communication with the source of second gas and not the source of first gas or the source of third gas.

4. A fluidized bed reactor system comprising a reaction chamber comprising at least one reaction chamber wall and a distributor for distributing gas into the reaction chamber and comprising a plurality of distribution openings which provide fluid communication between the reaction chamber and a source of a first gas, a source of a second gas and a source of third gas, each distribution opening having a channel portion, a flare-out portion and a throttle portion disposed between the channel portion and flare-out portion, the distributor having a plurality of cones, the flare-out portion being in fluid communication with the throttle portion of the distribution opening and a cone, the plurality of distribution openings comprising a plurality of peripheral openings having channel portions that are angled toward the interior openings from the bottom to the top of the distributor, and throttle portions and flare-out portions that are parallel with a longitudinal axis of the distributor, a plurality of interior openings and a plurality of central openings, wherein the peripheral openings are configured to provide fluid communication with the source of first gas and not the source of second gas or the source of third gas.

5. The fluidized bed reactor system as set forth in claim 4 wherein the central openings are configured to provide fluid communication with the source of third gas but not the source of first gas or the source of second gas.

6. The fluidized bed reactor system as set forth in claim 4 wherein the interior openings are in fluid communication with the source of second gas and are not in fluid communication with the source of first gas or the source of third gas.

7. The fluidized bed reactor system as set forth in claim 4 comprising a first gas plenum in fluid communication with the source of first gas and the reaction chamber, a second gas plenum in fluid communication with the source of second gas and the reaction chamber and a third gas plenum in fluid communication with the source of third gas and the reaction chamber.

8. The fluidized bed reactor system as set forth in claim 7 further comprising an inlet block, an outer ring, an interior ring concentric to the outer ring and a central ring concentric to the outer ring and interior ring and wherein the first gas plenum is defined by the space between the distributor, inlet block, outer ring and interior ring and the second gas plenum is defined by the space between the distributor, inlet block, interior ring and central ring.

9. The fluidized bed reactor system as set forth in claim 8 further comprising a product withdrawal tube concentric to the outer ring, interior ring and central ring and that extends through the distributor and inlet block and wherein the third gas plenum is defined by the space between the distributor, inlet block, central ring and the product withdrawal tube.

10. The fluidized bed reactor system as set forth in claim 9 wherein the inlet block comprises a first gas channel in fluid communication with the first gas plenum, a second gas channel in fluid communication with the second gas plenum and a third gas channel in fluid communication with the third gas plenum.

11. The fluidized bed reactor system as set forth in claim 4 wherein the cones that are in fluid communication with the flare-out portion of the peripheral distribution openings open into the reaction chamber.

12. The fluidized bed reactor system as set forth in claim 1 wherein the peripheral openings are disposed in a beveled portion of the distributor and direct the first gas parallel to the reaction chamber wall.

13. The distributor of claim 1 further comprising a plurality of cones, the flare-out portion being in fluid communication with the throttle portion of the distribution opening and the cone.

14. The distributor of claim 1 further comprising a product withdrawal tube extending at least partially through the distributor for the removal of product particles.

15. The distributor of claim 1 further comprising a cooling channel extending through the distributor.

16. The distributor of claim 1 wherein the longitudinal length of the channel is substantially greater than the longitudinal length of the flare-out portion.

17. The distributor of claim 1 further comprising an annular recess for receiving an annular ring to maintain separation of the first gas and the second gas prior to entering the distributor.

* * * * *